US010453106B2

(12) United States Patent
Sandstrom

(10) Patent No.: US 10,453,106 B2
(45) Date of Patent: Oct. 22, 2019

(54) MAXIMIZING THROUGHPUT OF MULTI-USER PARALLEL DATA PROCESSING SYSTEMS

(71) Applicant: Mark Henrik Sandstrom, Helsinki (FI)

(72) Inventor: Mark Henrik Sandstrom, Helsinki (FI)

(73) Assignee: THROUGHPUTER, INC., Jersey City, NJ (US)

( * ) Notice: Subject to any disclaimer, the term of this patent is extended or adjusted under 35 U.S.C. 154(b) by 1102 days.

(21) Appl. No.: 14/521,490

(22) Filed: Oct. 23, 2014

(65) Prior Publication Data

US 2015/0206209 A1 Jul. 23, 2015
US 2018/0349969 A9 Dec. 6, 2018

Related U.S. Application Data

(63) Continuation of application No. 13/297,455, filed on Nov. 16, 2011, now abandoned.

(60) Provisional application No. 61/556,065, filed on Nov. 4, 2011.

(51) Int. Cl.
*G06Q 30/04* (2012.01)
*G06F 9/50* (2006.01)
*G06F 9/48* (2006.01)
*G06F 9/54* (2006.01)

(52) U.S. Cl.
CPC .......... *G06Q 30/04* (2013.01); *G06F 9/4881* (2013.01); *G06F 9/5011* (2013.01); *G06F 9/5027* (2013.01); *G06F 9/546* (2013.01)

(58) Field of Classification Search
CPC .. G06Q 20/382; G06Q 30/04; G06Q 30/0283; G06F 9/5066; G06F 9/5083; G06F 9/5027; G06F 9/5077; G06F 9/5072; G06F 9/4881; G06F 9/5011; G06F 9/546
USPC ................................... 718/101–108; 705/34
See application file for complete search history.

(56) References Cited

U.S. PATENT DOCUMENTS

| | | | |
|---|---|---|---|
| 5,031,146 A | 7/1991 | Umina et al. | |
| 5,612,891 A * | 3/1997 | Butts ................... | G06F 17/5027 326/38 |
| 7,802,255 B2 * | 9/2010 | Pilkington ............ | G06F 9/3851 712/216 |
| 7,984,246 B1 | 7/2011 | Yung | |
| 8,060,610 B1 * | 11/2011 | Herington ............. | G06F 9/5077 705/400 |

(Continued)

*Primary Examiner* — Igor N Borissov
(74) *Attorney, Agent, or Firm* — Gardella Grace P.A.

(57) ABSTRACT

The invention provides systems and methods for maximizing revenue generating throughput of a multi-user parallel data processing platform across a set of users of the service provided with the platform. The invented techniques, for any given user contract among the contracts supported by the platform, and on any given billing assessment period, determine a level of a demand for the capacity of the platform associated with the given contract that is met by a level of access to the capacity of the platform allocated to the given contract, and assess billables for the given contract at least in part based on such met demand and a level of assured access to the capacity of the platform associated with the given contract, as well as billing rates, applicable for the given billing assessment period, for the met demand and the level of assured access associated with the given contract.

15 Claims, 8 Drawing Sheets

(56) References Cited

U.S. PATENT DOCUMENTS

| | | |
|---|---|---|
| 2003/0235200 A1 | 12/2003 | Kendall |
| 2004/0168170 A1* | 8/2004 | Miller .................. G06F 9/5077 |
| | | 718/104 |
| 2005/0182838 A1* | 8/2005 | Sheets .................. G06F 9/5061 |
| | | 709/226 |
| 2006/0218376 A1 | 9/2006 | Pechanek |

* cited by examiner

MAXIMIZING THROUGHPUT OF MULTI-USER PARALLEL DATA PROCESSING SYSTEMS

CROSS-REFERENCE TO RELATED APPLICATIONS

This application is a continuation of a U.S. application Ser. No. 13/297,455, filed Nov. 16, 2011, which is incorporated by reference in its entirety. This application further claims the benefit of the following provisional applications, each of which is incorporated by reference in its entirety:

[1] U.S. Provisional Application No. 61/556,065, filed Nov. 4, 2011; and
[2] U.S. Provisional Application No. 61/539,616, filed Sep. 27, 2011.

This application is also related to the following, each of which is incorporated by reference in its entirety:

[3] U.S. Utility application Ser. No. 13/277,739, filed Oct. 20, 2011;
[4] U.S. Utility application Ser. No. 13/270,194, filed Oct. 10, 2011;
[5] U.S. Utility application Ser. No. 13/184,028, filed Jul. 15, 2011; and
[6] U.S. Provisional Application No. 61/476,268, filed Apr. 16, 2011.

BACKGROUND

1. Technical Field

This invention pertains to the field of digital data processing, particularly to the field of techniques for maximizing data processing throughput per unit cost across a set of software programs dynamically sharing a data processing system comprising multiple processing cores.

2. Descriptions of the Related Art

Computing systems will increasingly be based on large arrays of processing cores, particularly in higher capacity server type computers. The multi-core computing hardware will often be shared by a number of software applications, some of which may belong to different users, while also individual software applications will increasingly be executing on multiple processing cores in parallel. As a result, the set of application program processing tasks running on the set of cores of a given multi-core based computer will need to be updated, potentially highly frequently, in order to pursue sufficiently high application program level as well as system wide processing throughput. To cost-efficiently enable such dynamic application task switching on a parallel computing platform, novel multi-user parallel computing architectures are needed to support efficiently transferring the processing context of any given task to any core of the system as well as to facilitate efficient communication among the tasks of any given application program running on the multi-core data processing system. Moreover, innovations are needed regarding effective pricing and billing of user contracts, to increase the parallel computing cost-efficiency both for the users and provider of the computing service. Particular challenges to be solved include providing effective compute capacity service unit pricing model and billing techniques with appropriate incentives and tools to optimally spread users' data processing loads in time and space across the available parallel data processing resources, in order to pursue maximization of data processing throughput per unit cost for the users as well as maximization of profits for the service provider.

SUMMARY

The invention provides systems and methods for maximizing revenue generating data processing throughput of a multi-user parallel processing platform across a set of users of the computing capacity service provided with the platform. More specifically, the invention involves billing techniques, which, on any given billing assessment period among a series of successive billing assessment periods, and for any given user contract among a set of user contracts supported by the given platform: 1) observe a level of a demand for a capacity of the platform associated with the given contract that is met by a level of access to the capacity of the platform allocated to the given contract, and 2) assess billables for the given contract at least in part based on i) its level of assured access to the capacity of the platform and ii) the observed met portion of its demand for the platform capacity. Various embodiments of such billing techniques further include various combinations of additional steps and features, such as features whereby: a) the assessing is done furthermore based at least in part on billing rates for units of the level of assured access associated with the given contract and/or units of the met demand associated with the given contract, with said billing rates being set to different values on different billing assessment periods, in order to increase the collective billables associated with the user contracts supported by a given platform, b) the capacity of the platform is periodically, once for each successive capacity allocation period, re-allocated among the user contracts at least in part based on: i) the level of assured access to the capacity of the platform associated with the given contract and ii) the demand for the capacity of the platform by the given contract, and c) at least one of said steps of observing, reallocating and assessing is done by digital hardware logic operating without software involvement on at least some of the billing assessment periods. According to certain embodiments of the invention, the billing techniques operate based on time periods for which units of the processing capacity, e.g. CPU cores of a multi-core array, are periodically reallocated, and such time periods, referred to as capacity or core allocation periods (CAPs), i.e., time periods during which the capacity allocation at the platform, as well as the billing rates, remain constant, are configured to consist of a specified number of processing clock cycles. In other embodiments, the invented billing techniques operate based on time periods during which the billing rates remain constant but during which the capacity of the platform can be reallocated, and in such embodiments, the concepts of demand based core allocations (DBCAs) and core entitlements (CEs) for a given program, for billing purposes, refer to the average DBCA and CE levels, respectively, over the time periods for which the related billing rates remained constant. Collectively, these time periods based on which the invented billing techniques operate are referred to as billing assessment periods (BAPs).

An aspect of the invention provides a system for improving data processing service throughput per a unit cost of the service through billing adjustment techniques, with said system comprising digital logic for: 1) allocating an array of processing cores for processing software programs of a set of users of the service, and 2) assessing billables for the service for each given user of the service on successive BAPs based at least in part on quantities of cores among said array that any given user i) has a contractual entitlement for being allocated on each CAP of any given BAP if so demanded, with such a quantity referred to as a Core Entitlement (CE), and ii) got allocated to meet its expressed demands for cores on the CAPs of the given BAP, with such a quantity referred to as a Demand Based Core Allocation (DBCA). Various embodiments of such systems further include various combinations of additional features, such as features whereby a) the digital logic for assessing the billables for a given user for the service involves logic that multiplies the user's CE established for the given BAP with a CE billing rate applicable for that BAP, b) the digital logic for assessing the billables for a given user for the service involves logic that multiplies the user's DBCA determined for the given BAP with a DBCA billing rate applicable for that BAP, and c) the assessing is done furthermore based on billing rates for CEs and/or DBCAs, with at least one of the CE or DBCA billing rates being varied between the successive BAPs, to optimally spread the users' data processing loads for the dynamically allocated array of cores over time, thus maximizing the users' data processing throughput per unit cost as well as the service provider's billables from the user contracts.

Another aspect of the invention provides a method for improving data processing service throughput per unit cost of the service through billing adjustment techniques, with such a method comprising 1) repeatedly, once for each CAP, allocating an array of processing cores for processing software programs of a set of users of the service, and 2) adjusting billables for the service for each given user of the service on successive BAPs based at least in part on quantities of cores among said array that any given user i) has an entitlement for being allocated on each CAP of a given BAP and ii) got allocated to meet its demands for cores on the CAPs of the given BAP. Various embodiments of such methods further include various combinations of further steps and features such as those whereby a) the allocating is done at least in part based on entitlements and/or demands for cores among said array by one or more of the software programs of the set of users, and b) the adjusting is furthermore done based at least in part on a value of respective billing rates, applicable for a given BAP, for cores among said array that the given user's software program i) has an entitlement for on the given BAP and ii) got allocated to meet its demands for cores on the CAPs of the given BAP.

A further aspect of the invention provides a system for improving the revenue generation capability of a data processing platform for the operator of the platform providing computing capacity services for users dynamically sharing the platform, with the platform having a certain cost to its operator and a certain pool of processing resources for executing the users' software programs. Such a system comprises digital logic for: 1) allocating the pool of resources of the platform for processing the user programs at least in part based on the users' respective entitlements for the pool of resources, 2) adjusting a billing rate for the user's entitlements, for individual BAPs, at least in part based on a relative popularity of the entitlements on the individual BAPs among successive BAPs, and 3) digital logic for determining billables associated with each of the user programs, based at least in part on the adjusting of the billing rate for the entitlements. Various embodiments of such systems further include various combinations of additional features, such as features by which a) the pool of resources comprises an array of processing cores that are periodically allocated among the user software programs, b) the digital logic for allocating performs its allocating of the pool of resources furthermore at least in part based on demands for the resources among said pool by the user programs, c) the system further comprises digital logic for adjusting, for successive BAPs, a billing rate for resources among the pool allocated to a user program to meet a demand expressed by the user program for such resources, with the determining being based furthermore at least in part on the adjusting of the billing rate for such resources allocated based on demand, and d) the digital logic subsystems for allocating, adjusting and determining comprise hardware logic that, on at least some BAPs among the successive BAPs, operates automatically without software involvement Yet another aspect of the invention provides a method for improving a revenue generation capability of a data processing platform that has a certain pool of processing resources and that is dynamically shared among a set of user software programs. Such a method comprises 1) once for each new capacity allocation period, allocating the pool of resources for processing user programs at the platform at least in part based on respective entitlements for the pool of resources by the user programs, 2) adjusting a billing rate for said entitlements, for successive BAPs, at least in part based on a relative popularity of the entitlements on individual BAPs among the successive BAPs, and 3) determining, based at least in part on said adjusting, billables associated with the user programs. Various embodiments of such methods further include various combinations of further steps and features such as those whereby a) the determining further involves, for a given user program, and for individual BAPs among the successive BAPs, multiplying the entitlements for the pool of resources by the given user program on a given BAP with the billing rate for the entitlements on the given BAP, b) the allocating, on a given capacity allocation period, furthermore is based at least in part on respective demands for the resources among the pool by the user programs for the given capacity allocation period, c) there further is a step of adjusting, for successive BAPs, a billing rate for resources among the pool allocated to a user program to meet a demand by the user program for such demand based resource allocations, and with the determining being furthermore based at least in part on the adjusting of the billing rate for the demand based resource allocations, and d) the determining furthermore is based at least in part on i) resolving a level of the resources among the pool allocated to a user program to meet a demand by the user program for such resources on a given BAP and/or ii) applying a billing rate applicable for the resources resolved in i) on the given BAP.

In embodiments of the invention, either or both of the user's capacity entitlement and demanded based capacity allocation billing rates, as discussed above, can be set for different values on the different hours of day, days of week, seasons, special calendar dates, etc., in order to optimally spread the collective processing load of the user programs for a given platform over time, and thereby, increase the cost efficiency for the users of the computing service provided with the given platform and/or the revenue generation capability for the service provider operating the platform. For example, popular time periods for computing capacity services, which with flat billing rates would experience highest demands for the platform processing capacity, can according to embodiments of the invention be configured with premium billing rates, in order to incentivize the users to shift the execution of their non-time-critical programs and task (e.g. asynchronous, background or overnight batch processes) for execution on the otherwise less popular, discounted billing rate, time periods. Moreover, the capability per embodiments of the invention to facilitate optimally combining user contracts with complementary core entitlement (CE) time profiles on a given dynamically shared computing platform allows the service provider operating the platform to support a given set of user contracts with reduced total platform core capacity i.e. at reduced cost base, and thereby increase the competitiveness of the offered compute capacity service offering among the prospective customers in terms of price-performance. Examples of such user applications with mutually complementary i.e. minimally overlapping CE time profile peaks, which could be efficiently combined for the set of user programs to dynamically share a given platform per the invention, are realtime enterprise software applications (demanding peak performance during business hours), consumer media and entertainment applications (demanding peak performance in evening hours and during weekend) and overnight batch jobs (demanding peak capacity before the business hours of the day). Note also that a further advantage of embodiments of invented billing techniques is that, because a portion of the cost of the utility computing service for a user running its program on the platform is based on the (met) levels of core demands expressed by the user's program, the users of the compute capacity service provided with a computing platform utilizing the invented billing techniques have an economic incentive to configure their programs so that they eliminate core demands beyond the number of cores that the given program is actually able to effectively utilize at the given time. As the user applications thus are not to automatically demand at least their CE worth of cores irrespective of on how many cores the given program is able to execute on in parallel at any given time, the average amount of surplus cores for runs of the core allocation algorithm, i.e., cores that can be allocated in a fully demand driven manner (rather than in a manner to just meet the core demands by each application for their CE worth of cores), is increased, compared to a case where the users would not have the incentive to economize with their core demands. Such maximally demand driven core allocation (which nevertheless allows guaranteeing each user application an assured deterministic minimum system capacity access level, whenever actually demanded) facilitates providing maximized user program data processing throughput per unit cost across the set of user applications dynamically sharing a given computing platform per the invention. Consequently, this maximization of data processing throughput service per unit cost by the invention also drives the maximization of the profitability for computing capacity service provider operating such given platform per the invention.

BRIEF DESCRIPTION OF THE DRAWINGS

FIG. 1, FIGS. 2-3 illustrate operation and internal structure of the system controller, and FIGS. 4-7 those of the fabric network. As shown in FIG. 3, the controller also involves a billing subsystem, the internal modules and operating of which are illustrated in FIG. 8, according to an embodiment of the invention.

FIG. 2 provides a context diagram for a process, implemented by the controller of a system per FIG. 1, to select and map active tasks of application programs configured to run on the system to their target processing cores, in accordance with an aspect of the invention.

FIG. 3 illustrates, in accordance with an aspect of the invention, a flow diagram and major steps for the system controller process per FIG. 2, as well as operating context for the contract billing subsystem illustrated in FIG. 8.

DETAILED DESCRIPTION

Figure 1:
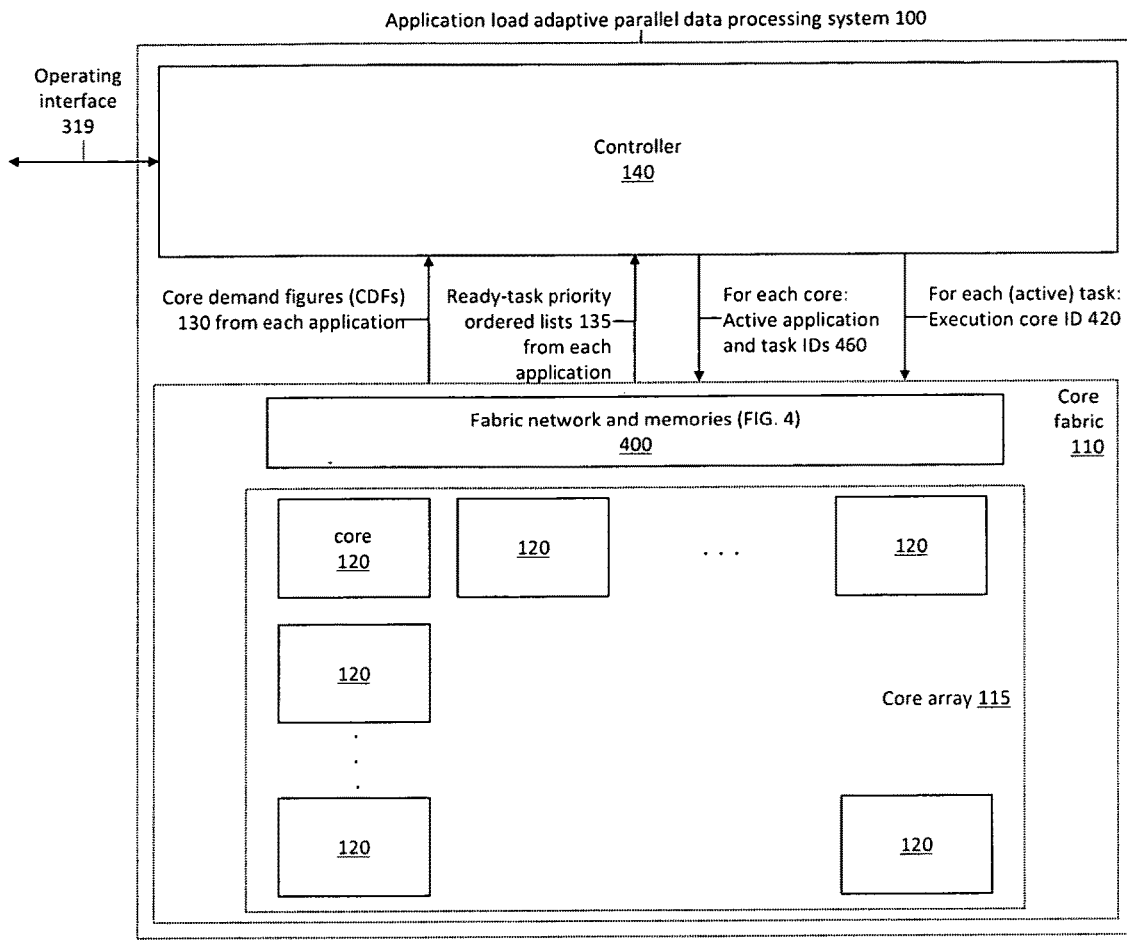
FIG. 1 shows, in accordance with an embodiment of the invention, a functional block diagram for an application program load adaptive parallel data processing system, comprising a multi-core fabric, member cores of which are dynamically space and time shared among processing tasks of a set of software programs, with the sharing of fabric of cores among the software programs controlled by a system controller module, and with switching of program tasks to their execution cores and inter-task communications handled through an efficient fabric network. In general context of systems per

The invention is described herein in further detail by illustrating the novel concepts in reference to the drawings. General symbols and notations used in the drawings:

- Boxes indicate a functional digital logic module; unless otherwise specified for a particular embodiment, such modules may comprise both software and hardware logic functionality.
- Arrows indicate a digital signal flow. A signal flow may comprise one or more parallel bit wires. The direction of an arrow indicates the direction of primary flow of information associated with it with regards to discussion of the system functionality herein, but does not preclude information flow also in the opposite direction.
- A dotted line marks a border of a group of drawn elements that form a logical entity with internal hierarchy, such as the modules constituting the multi-core processing fabric 110 in FIG. 1.
- Lines or arrows crossing in the drawings are decoupled unless otherwise marked.
- For clarity of the drawings, generally present signals for typical digital logic operation, such as clock signals, or enable, address and data bit components of write or read access buses, are not shown in the drawings.

Figure 2:
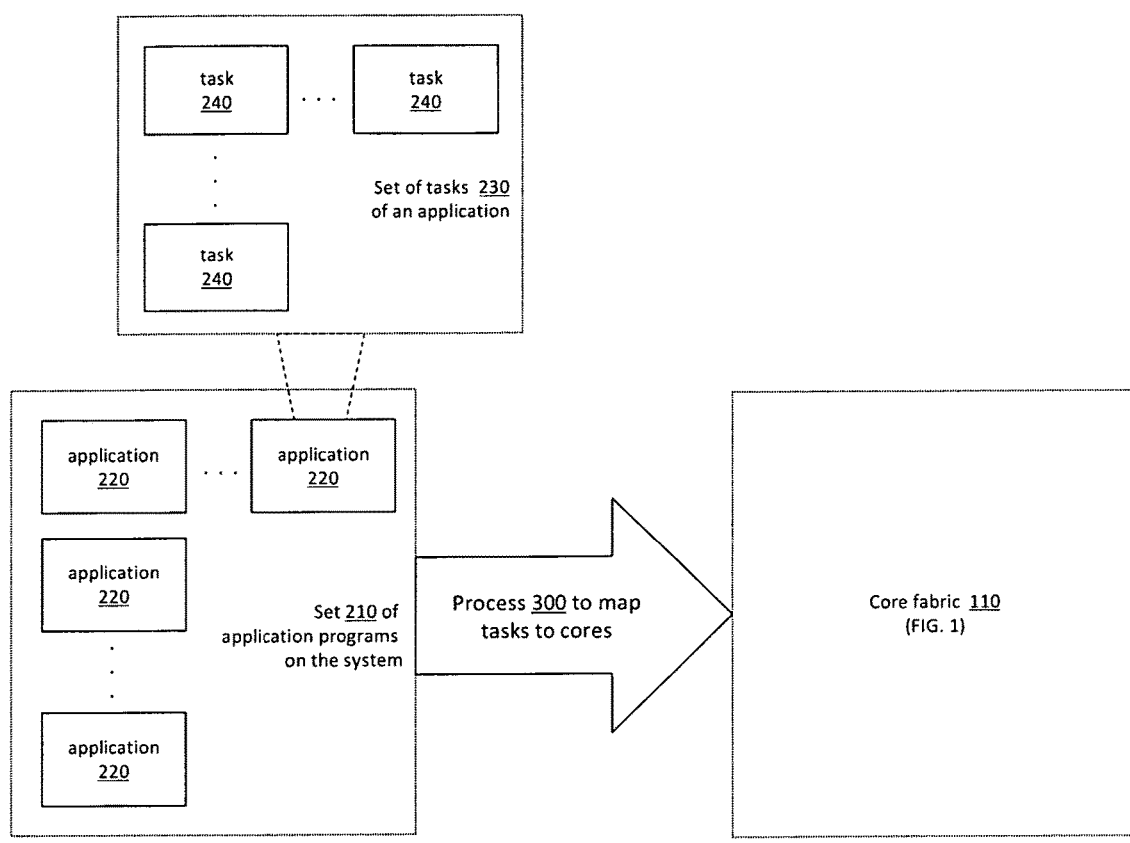
Figure 3:
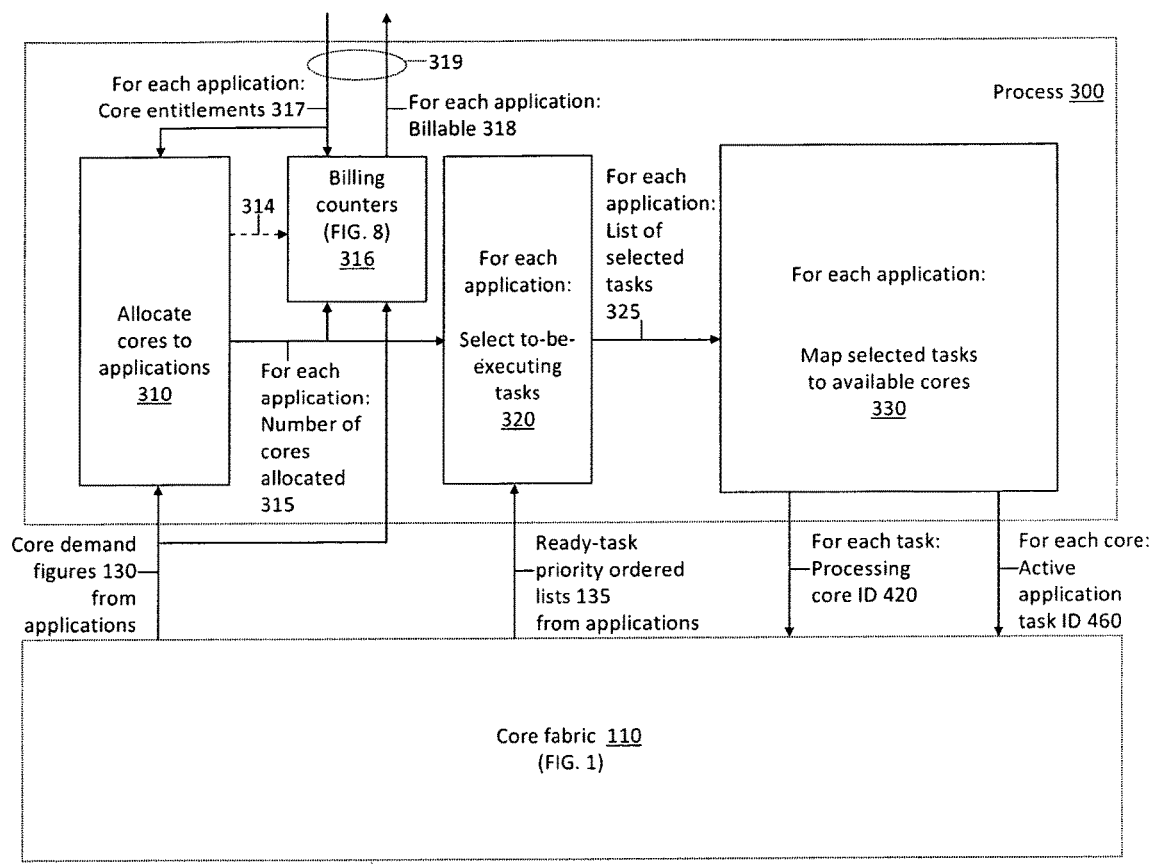

FIGS. 1-3 and related descriptions below provide specifications for a multi-core data processing platform, according to embodiments of aspects of the invention, while FIGS. 4-7 and associated descriptions provide specifications for networking and memory resources to enable dynamically running any selected data processing task on any processing core of the platform as well as to support efficient communications among such tasks, according to embodiments of aspects of the invention. Finally, FIG. 8 and related specifications describe embodiments for billing subsystem for a multi-user parallel processing platform per preceding FIGS., along with operating scenario examples for the billing rate adjustment based computing cost efficiency maximization techniques.

FIG. 1 provides a functional block diagram for an embodiment of the invented multi-core data processing system dynamically shared among data processing tasks of application software programs, with capabilities for application processing load adaptive allocation of the cores among the software applications configured for the system, as well as (as described in relation to FIGS. 4-7) efficient inter-core task-switching and inter-task communication resources, as well as (as described in relation to FIG. 8) user's cost efficiency and the compute service provider's profit maximizing pricing adjustment and billing techniques.

Note that the terms software program, application program, application and program are used interchangeably in this specification, and each generally refer to any type of computer software able to run on data processing systems according to any embodiments of the invention. Also, references to a "set of" units of a given type, such as programs, logic modules or memory segments can, depending on the nature of a particular embodiment or operating scenario, refer to any positive number of such units.

For general context, the system per FIG. 1 comprises processing core fabric 110 with an array 115 of cores 120 for processing instructions and data of a set of software application programs configured run on the shared system 100. While in such a manner processing the application programs to produce processing results and outputs, the cores of the system access their input and output data arrays, which in embodiments of the invention comprise memories and input/output communication ports accessible directly or indirectly to one or more of the cores. Since the discussion herein is directed primarily to techniques for dynamically sharing the processing cores of the system among its application programs as well as for efficiently running such programs on the cores of the system in parallel, rather than on implementation details of the cores themselves, aspects such as memories and communication ports of the cores or the system 100, though normally present within embodiments of the multi-core data processing system 100, are not shown in FIG. 1. Moreover, it shall be understood that in various embodiments, any of the cores 120 of a system 100 can comprise any types of software program processing hardware resources, e.g. central processing units (CPUs), graphics processing units (GPUs), digital signal processors (DSPs) or application specific processors (ASPs) etc. as well as time share or other abstractions or virtualizations thereof. Embodiments of systems 100 can furthermore incorporate CPUs etc. processing cores that are not part of the dynamically allocated array 115 of cores, and such CPUs etc. outside the array 115 can in certain embodiments be used to manage and configure e.g. system-wide aspects of the entire system 100, including the controller module 140 of the system and the array 115. For the operator to configure and monitor the system 100, embodiments of the invention provide a management interface 319 to pass information between the operator's management tools (e.g. user interface and related software on a PC or terminal) and the data processing platform 100. Note that in various embodiments the actual software programs for configuring and monitoring processes for the system 100 can be run as an application 220 of a system (including either on the same or different instance of system 100 than the given instance being managed) as well as such software programs can be run in a different platforms, e.g. on a PC supporting the management user interface.

As illustrated in FIG. 1, the invention provides a data processing system 100 comprising an array 115 of processing cores 120, which are dynamically shared by a set of application programs configured to run on the system. In an embodiment of the invention, the individual application programs running on the system maintain at specified addresses within the system 100 memories their processing capacity demand indicators signaling 130 to the controller 140 a level of demand of the system processing capacity by the individual applications. In a particular implementation, each of these indicators 130, referred to herein as core-demand-figures (CDFs), express how many cores 120 their associated application program is presently able utilize for its data processing tasks. Moreover, in certain embodiments, the individual applications maintain their CDFs at specified registers within the system, e.g. in known addresses within the memory space of their root processes (i.e. task ID#0 of each application), with such application CDF registers being accessible by hardware logic of the controller module 140. For instance, in an embodiment, the CDF 130 of a given application program is a function of the number of its schedulable tasks, such as processes, threads or functions (referred to collectively as tasks) that are ready to execute at a given time. In a particular embodiment of the invention, CDF of an application program expresses on how many processing cores the program is presently able to execute in parallel. Moreover, in certain embodiments, these capacity demand indicators, for any given application, include a list 135 identifying its ready tasks in a priority order.

A hardware logic based controller module 140 within the system, through a repeating process, allocates and assigns the cores 120 of the system 100 among the set of applications and their tasks, at least in part based on the CDFs 130 of the applications. In certain embodiments, this application task to core assignment process 300 (see FIGS. 2 and 3) is exercised periodically, e.g. at even intervals such as once per a given number (for instance 64, or 1024, or so forth) of processing core clock or instruction cycles. In other embodiments, this process 300 can be run e.g. based on a change in the CDFs 130 of the applications 220. Also, in particular implementation scenarios, the conceptual module 140 includes application program specific sub-modules, which run task to core assignment algorithms within a given application program based on a change in the task priority listing 135 for the given application. While such conceptual application-specific sub-modules can impact which application tasks will be executing on the fabric 110, they will not by themselves change the numbers of cores allocated to any given application on the system. Accordingly, these application-internal task selection sub-processes can be run also in between of successive runs of the complete core allocation and assignment process 300. The application task to core assignment algorithms of controller 140 produce, for the cores of the fabric 115, identification of their respective tasks to process 460, as well as for the application tasks on the system, identification of their execution cores 420 (if any, at a given time). Note that the verb "to assign" is used herein reciprocally, i.e., it can refer, depending on the perspective, both to assignment of cores 120 to tasks 240 (see FIG. 2) as well as to mapping of tasks 240 to cores 120.

This is due to that, in the embodiments studied here in greater detail, the allocation and mapping algorithms of the controller 140 cause one task 240 to be assigned per any given core 120 of the array 115 by each run of such algorithms 300 (see FIGS. 2 and 3). As such, when it is written here, e.g., that a particular core #X is assigned to process a given task #Y, it could have also been said that task #Y is assigned for processing by core #X. Similarly, references such as "core #X assigned to process task #Y", could be written in the (more complex) form of "core #X for processing task #Y assigned to it", and so forth.

Though not explicitly shown in FIG. 1, embodiments of the system 100 also involve timing and synchronization control information flows between the controller 140 and the core fabric 115, to signal events such as launching and completion of the process 300 (FIGS. 2-3) by the controller as well as to inform about the progress of the process 300 e.g. in terms of advancing of its steps (FIG. 3). Also, in embodiments of the invention, the controller module is implemented by digital hardware logic within the system, and in particular embodiments, such controller modules exercise their repeating algorithms, including those of process 300 per FIGS. 2-3, without software involvement. Embodiments for the communications network and memory resources 400 of the multi-core fabric 110 are described in relation to FIGS. 4-7.

FIG. 2 illustrates context for the process 300 performed by the controller logic 140 of the system 100, repeatedly mapping the to-be-executing tasks 240 of the set of application programs 210 to their target cores 120 within the array 115. In an embodiment, each individual application 220 configured for a system 100 provides a (potentially updating) collection 230 of its tasks 240, even though for clarity of illustration in FIG. 2 this set of applications tasks is shown only for one of the applications within the set 210 of applications configured for a given instance of system 100. For the sake of illustration and description, the cores of within the array 115 are herein identified with their core ID numbers from 0 through the number of cores within the array 115 less 1, the applications within the set 210 with their application ID numbers from 0 through the number of applications among that set 210 less 1, and the set of tasks 230 of any given application with their task ID numbers from 0 through the number of tasks supported per the given application less 1.

Note also that in certain embodiments, any application program instance 220 for a system 100 can be an operating system (OS) for a given user or users of the system 100, with such user OS supporting a number of applications of its own, and in such scenarios the OS client 220 on the system 100 can present such applications of it to the controller 140 of the system as its tasks 240.

Moreover, in embodiment of the invention, among the applications 220 there can be supervisory or maintenance software programs for the system 100, used for instance to support configuring other applications 220 for the system 100, as well as provide general functions such as system boot-up and diagnostics, and facilitate access to networking, I/O and system-wide memory etc. resources of the platform 100 also by other application programs of the system.

In the general context per FIGS. 1 and 2, FIG. 3 provides a conceptual data flow diagram for an embodiment of the process 300, which maps each selected-to-execute application task 240 within the sets 230 to one of the cores 120 within the array 115.

More specifically, FIG. 3 presents, according to an aspect of the invention, conceptual major phases of the task-to-core mapping process 300, used for maximizing the application program processing throughput of a data processing system hardware shared among a number of software programs. Such process 300, repeatedly mapping the to-be-executing tasks of a set of applications to the array of processing cores within the system, involves series of steps as follows:

(1) allocating 310 the array of cores among the set of programs on the system, at least in part based on CDFs 130 by the programs, to produce for each program 220 a number of cores 220 allocated to it 315 (for the time period in between the current and the next run of the process 300); and (2) based at least in part on the allocating 310, for each given application that was allocated at least one core: (a) selecting 320, according to the task priority list 135, the highest priority tasks within the given application for execution corresponding to the number of cores allocated to the given application, and (b) mapping 330 each selected task to one of the available cores of the array 115, to produce, i) for each core of the array, an identification 460 of an application and a task within the application that the given core was assigned to, as well as ii) for each application task selected for execution on the fabric 115, identification 420 of its assigned core.

The repeatedly produced and updated outputs 420, 460 of the controller 140 process 300 will be used for repeatedly re-configuring connectivity through the fabric network 400, as described in the following with references to FIGS. 4-7.

FIG. 3 also provides context for the user billing processes for the utility computing services provided with the platform 100. According to embodiments of the invention, these billing processes involve per-application billing counters 316, implementation and operating scenarios for which are discussed in relation to FIG. 8.

FIGS. 4-7. and related specifications below describe embodiments for on-chip network 400 of a system 100 and operating scenarios thereof, to achieve non-blocking transferring of memory images of tasks of software programs between cores of the fabric 110, as well as inter-task communication, through efficiently arranged access to fabric memories. The inter-core and inter-task information exchange resources per FIGS. 4-7, in an embodiment of the invention, comprise hardware logic, and are capable of operating without software. The capabilities per FIGS. 4-7 provide logic, wiring, memory etc. system resource efficient support for executing any application task 240 at any core 120 within the system at any given time, as controlled, at least in part, by the controller 140 that regularly optimizes the allocation of cores of the array 115 among the applications 220 on the system 100, as well as maps specific application tasks 240 to specific processing cores 120. The minimum overhead inter-task communications, also supported by the on-chip network 400, further enables resource efficiently achieving high performance for the application software programs 210 that dynamically share the multi-core based data processing platform 100.

Figure 4:
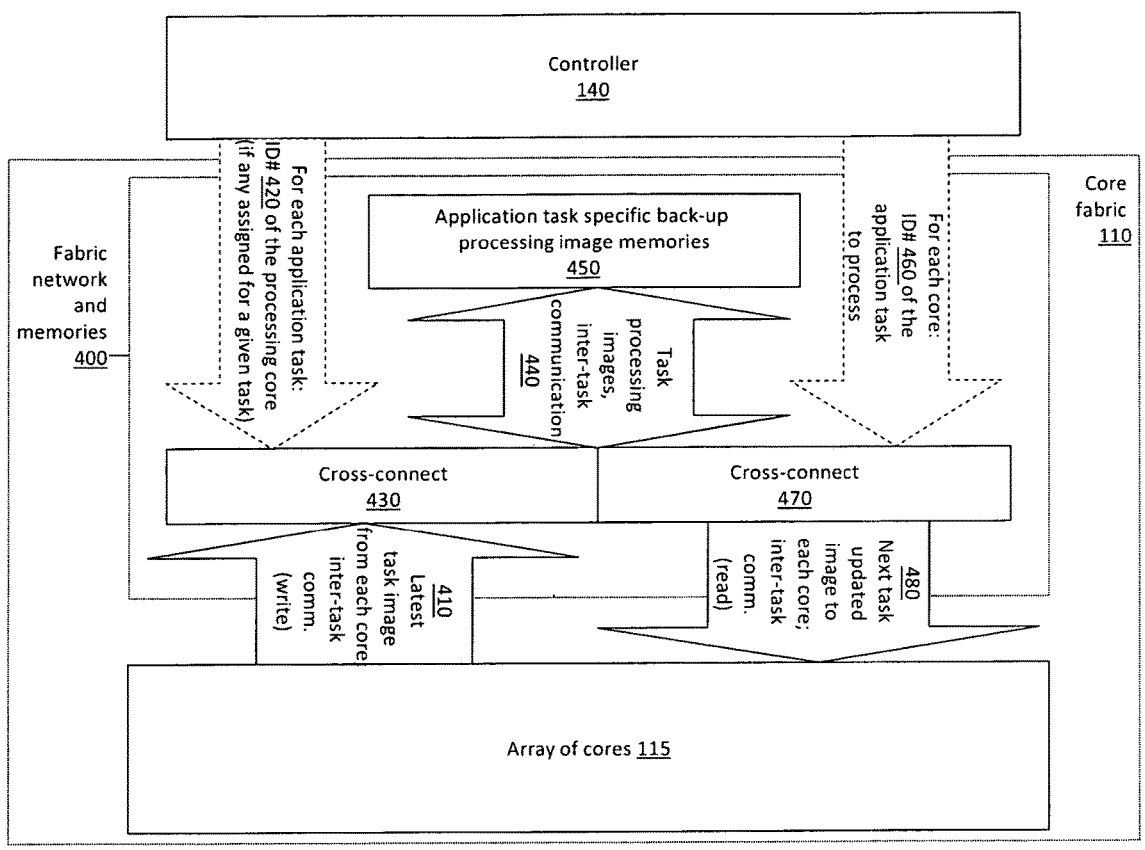
FIG. 4 illustrates, in accordance with an embodiment of the invention, a network and memory architecture for the multi-core fabric of a system per FIG. 1.

FIG. 4 illustrates the task image transfer and inter-task communications network and memory resources 400 for an embodiment of the core fabric 110 (see FIG. 1 for further context of the conceptual module 400). Note that in FIGS. 3-8, for clarity of illustration of the functionality of the inter-core and inter-task communications facilities, certain signals that are primarily timing or control signals (as contrasted with data buses and such) are marked with gapped-line arrows. Examples of such control signals are control information flows provided to direct the multiplexing of the read and write data buses, as well as signals providing timing control.

Figure 5:
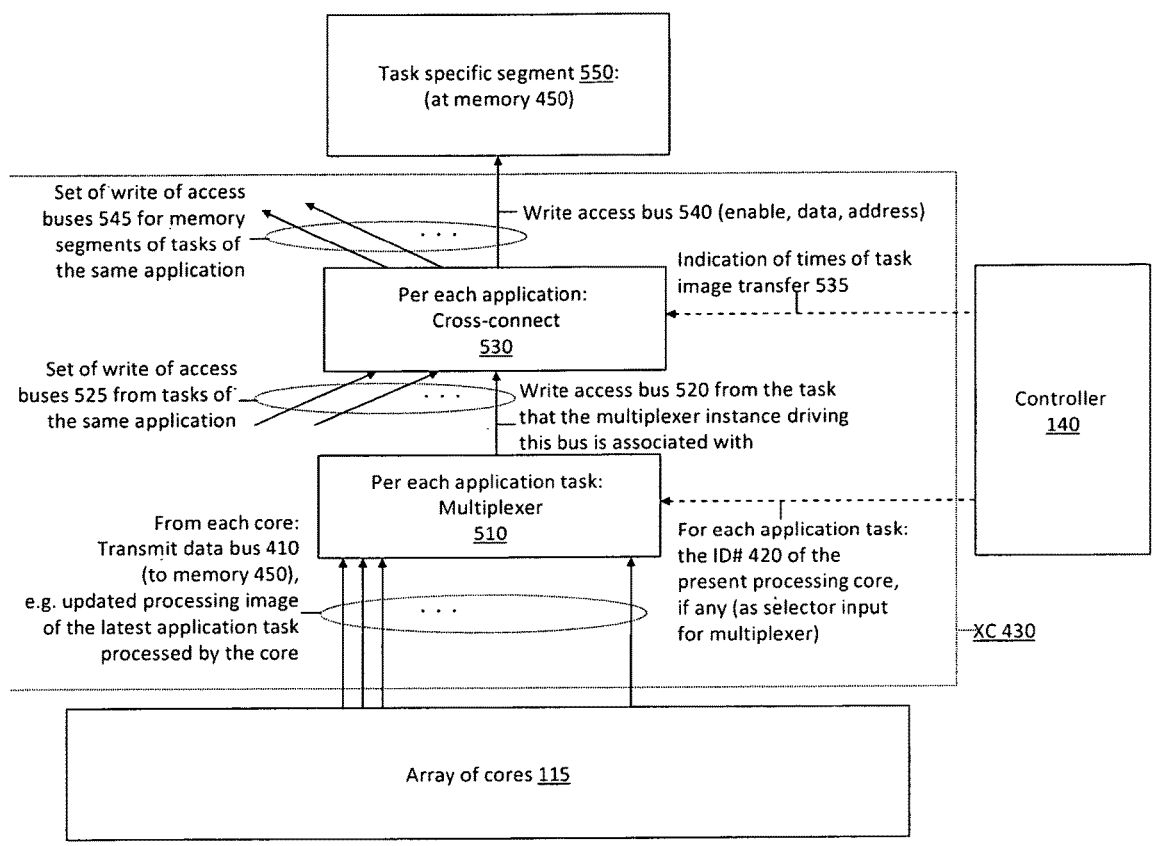
FIG. 5 shows at more detail level a portion of an embodiment of a logic system per FIG. 4 concerning functions of backing up updated task memory images from the cores of the fabric to the task specific segments in fabric memories, as well as writing of inter-task communication information by tasks of application programs running on the system to such memory segments of each others.
Figure 6:
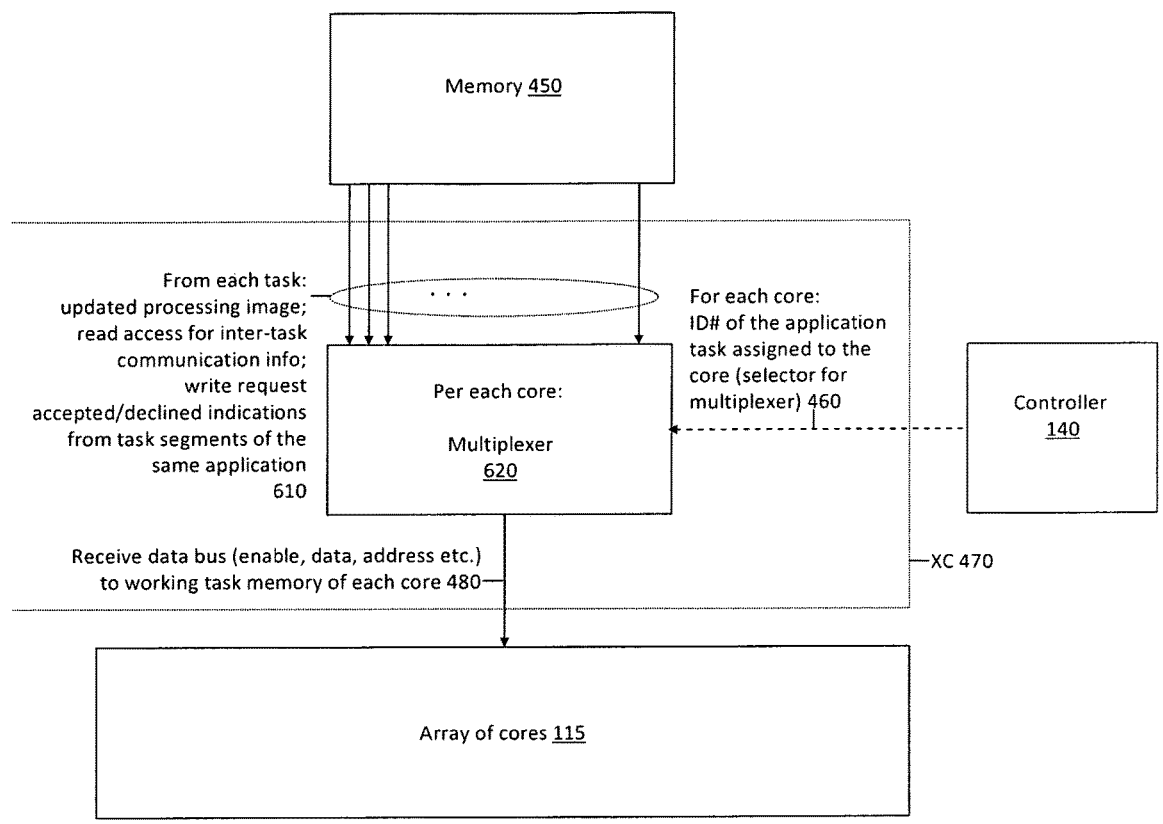
FIG. 6 shows at more detail level an embodiment of a portion of a logic system per FIG. 4 concerning functions of retrieving updated task memory images from the task specific segments in the fabric memories to their next processing cores within the fabric, as well as reading of inter-task communication information by tasks of applications running on the system from their segments in such memories.

Fabric network for system per FIG. 1: Transferring memory images of tasks of software programs executing on the system between cores and backup memories of the multicore processing fabric:

Regarding system functionality for switching executing tasks for cores of fabric 110, FIG. 4 provides a conceptual diagram for a logic system 400 to back-up and transfer the latest processing memory image (referred to herein on herein also simply as image) of any application program task 240 on the system 100 from and to any core 120 within the array 115, in accordance with an embodiment of the invention. As will be described later on (after the description of FIG. 6), the inter-core network and memory system 400 will, at least in certain embodiments, be used also for inter-task communication among the application program tasks running on the system 100. Note that in relation to FIGS. 4-7, in embodiments of the invention where the individual core specific memories within the array are not intended to contain the instructions and data for all the application tasks on the system, but rather for the specific task assigned for any individual core at a given time, the notion of task processing image refers to the memory image used by the processing of the task. Various embodiments, implementing various designs between (and including) the extremes, on one end, of each core providing a dedicated memory segment for each application task on the system and, on the other end, of each core providing a plain working memory holding the memory image of the application task assigned to it, will have their corresponding definitions of what information needs to be transferred between cores and interim memories (if any) to backup, retrieve or relocate a task. In scenarios studied in detail in the following in connection with FIGS. 4-7, it is assumed that each core of the array 115 holds in its memory the image of the application task assigned to it at a given time. Such a scenario significantly reduces the amount of memory needed by the individual cores as well as across the system 100, while it calls for a capability to transfer the task processing memory images between cores and back-up memories when having to resume processing of a task after a period of inactivity, possibly at a different core than its previous processing core. FIGS. 4-6 and related descriptions below illustrate a logic system with such a memory image transfer capability.

At a digital logic design level, according to the herein studied embodiments per FIG. 4, the controller 140 identifies 420, to a cross-connect (XC) 430 between the core array 115 and memory array 450, the appropriate source core from which to select the updated image 440 for each given application task specific segment 550 within the memory 450. In an alternative embodiment, each core 120 identifies 420 the application task ID# along with its updated processing image to the XC 430. In addition, at times of task switchover, under control from the controller 140, the appropriate updated new task processing images 440 are transferred from the memories 450 through another controller controlled 460 cross-connect (XC) 470 to each given core of the array 115 subject to task switchover 120. Specifically, the controller 140 provides for the XC 470 identification 460 of the next application tasks 440 for the individual cores of the array 115, which causes the appropriate updated processing image to be transferred 480 from the memory array 450 to each given core of the system 100 subject to task switchover. Naturally, any given core for which the assigned application task ID# remains the same on successive core allocation periods (CAPs) can resume processing such task uninterruptedly through such allocation period boundaries, without having halt processing.

Note also that in case of certain embodiments, the XCs 430 and 470 are collectively referred to as a cross-connect between the array 115 of cores and the memories 450 of the fabric 110. Also, in certain scenarios, the concept of on-chip network refers to the XCs 430 and 470 and the fabric and core memory access buses 410, 440, 480 they cross-connect, while in other scenarios, that concept includes also the fabric memories 450.

In a particular operating scenario, at end of any given core to task allocation period or after the set of tasks of any given application selected for execution chances (even within a CAP), for each such core within the system that got assigned a different next task to process (with such cores referred to as cores subject to task switchover), the updated processing image of its latest task is backed up 410 to a memory 450 that provides a dedicated memory segment 550 and related access logic (FIGS. 5-7) per each application task configured for the system 100. Specifically, in an embodiment, controller 140 through logic with core-specific multiplexers at XC 470 provides, at least conceptually as part of the bus 480, indications to the cores 120 regarding task switchovers, in response to which system software at the cores subject to a switchover causes the existing task to be backed up 410 to its segment 550 at memory array 450 and, following that, to retrieve 480 the next task's image from its segment 550 at memory array 450. Moreover, in a particular embodiment, after a core subject to task switchover has backed up 410 its outgoing task, the core will signal back to its multiplexer (element 620 in FIG. 6) at XC 470 to apply the provided new configuration 460, to cause the incoming application's image to be transferred 480 (under control of the core's system software) to the working memory of the core, and so that the incoming task assigned to execute on the core will be connected (in read mode) 480 to its segment 550 at memories 450. Furthermore, according to such embodiments, the system software on a core subject to switchover also signals to controller 140 about completion of backing up its outgoing task, based on which the controller applies the updated configuration 420, i.e. identification of the incoming task ID#, for the task-specific multiplexer 510 at XC 430, so that the incoming task assigned to execute on the core is connected (in write mode) 410 to memory segments 550 of tasks of its application 220, as well as so that the core of its execution will be connected in write mode to the correct memory segment 550 once that task is to be backed up 410 (see also FIG. 5 for further details). Note further that in certain embodiments of the invention, cores 120 support two sides of their working memories, to allow backing up 410 and retrieving 480 of the outgoing and incoming tasks to proceed concurrently, by copying 480 the incoming task's image to different side of the working memory than what was used for the outgoing task's image, and by switching the active side of the working memory to the incoming task's side following the copying of its image from its segment 550 at the fabric memories 450. According to certain implementation practices, the cores also provide a memory space for their system software, which however, according to the herein discussed operating scenarios, is not activated during user application task processing times (i.e. between task switchovers).

According to the embodiments of the invention described herein in greater detail, based on the control 460 by the controller 140 for a given core indicating that it will be subject to a task switchover, the currently executing task is made to stop executing and its processing image is backed up 410, 520, 540 to the memory 450 (FIGS. 4 and 5), and following (as well as in certain embodiments, during) that, the memory image of the next task assigned to execute on the given core is retrieved 610, 480 to the core from the memory 450 (FIGS. 4 and 6). During these application task switching proceedings the operation of the cores subject to task switchover is controlled through the controller 140 and system software configured for the cores, with said system software managing the backing up and retrieving of the outgoing and incoming task memory images from the memories 450, as well as stopping the execution of the outgoing task before backing it up and getting the incoming task processing started once the local working memory of the core is configured with the incoming task's processing image. In these type of embodiments, cores not indicated by controller 140 as being subject to task switchover are able to continue their processing uninterruptedly even over the CAP transition times without any idle time.

Note that, according to embodiments of the invention described in the foregoing, applying of updated task ID# configurations 460 for the core specific multiplexers 620 of XC 470 (see FIGS. 4 and 6), as well as applying of the updated processing core ID# configurations 420 for the application task specific multiplexers 510 at XC 430 (see FIGS. 4 and 5), can thus be safely and efficiently done on one multiplexer at a time basis (reducing the system hardware and software implementation complexity and thus improving cost-efficiency), since tasks do not need to know whether and at which core in the fabric 115 they or other tasks are executing at any given time. Instead of relying on knowledge of the their respective previous, current (if any at any given time) or future execution cores by either the tasks or the system software of the cores, the invention enables flexibly running any task of any application at any core of the fabric, while providing inter-task communication more cost-efficiently through connecting the cores to their appropriate application task specific segments 550 at the fabric memories 450.

FIG. 5 shows, at a more detail level, a portion of the logic system 400 (see FIGS. 1 and 4 for context) for backing up the updated task processing images from the cores of the system 100 to the task specific back-up memories 450, in accordance with an embodiment of the invention. As will be discussed later on, following the description per FIG. 6, the logic system per FIG. 5 is, in certain embodiments, used also for the tasks of any given application executing on the system 100 to write their inter-task communication info for each others.

In the task memory image backup mode of use of the logic per FIG. 5, according to the embodiment studied here in greater detail, each core 120 of the array 115 that is subject to task switchover transmits 410, through the XC 430 to its segment 550 in the memories 450 the updated processing image of its latest application task when signaled to do so by controller 140, in embodiments through its associated multiplexer 620 at XC 470. The XC 430 comprises, in a particular embodiment, a set of application task specific multiplexers 510, each of which selects the updated processing image instance from the set 410 corresponding to its task ID# for writing 540 to its associated task specific segment 550 at the memory array 450. Each such task specific multiplexer 510 make theses selections based on control 420 from the controller 140 that identifies the core that processed its associated application task before a task switchover. In case a given task was not being processed at a given time, in an embodiment the controller controls 420 the multiplexer 510 instance associated with such task to not write anything on its associated segment 550 on the memory 450. In addition, the buses 410, 525 and 545 include a write enable indicator, along with write data and address (and any other relevant signals), from their source cores to the memory segments 550, to control (together with other system logic, e.g. per FIG. 7) write access from cores 120 to memory segments 550. The role of XC 530 will be described in reference to FIG. 7; for the task memory image backup mode, the XC 530 can be considered as being controlled 535 by the controller to simply pass-through connect the write access bus 520 of each application task finishing execution on a core of the array 115 to its segment 550 at memories 450.

At digital logic design level, a possible implementation scenario for functionality per FIG. 5 is such that the signal bus instance within the set 410 carrying the updated processing images from the core ID #n (n is an integer between 0 and the number of cores in the array less 1) is connected to the data input #n of each multiplexer 510 of XC 430, so that the identification 420 of the appropriate source core ID# by the controller to a given multiplexer 510 causes XC 430 to connect the updated task processing image transmissions 410 from the core array 115 to their proper task specific segments 550 within the memory 450. In an embodiment, controller 140 uses information from an application task ID# addressed look-up-table per Table 4 format (shown in later in this specification) in supplying the latest processing core identifications 420 to the application task specific multiplexers 510 of XC 430.

FIG. 6 shows at a greater level of detail, in accordance with an embodiment of the invention, a portion of the logic system per FIG. 4 for retrieving the updated task processing images from the task specific back-up memories to their next processing cores within a system per FIG. 1. As will be discussed following this description of FIG. 6, the logic system per FIG. 6 is, in certain embodiments, used also for the tasks of an application executing on the system 100 to read their inter-task communication info from each others.

According to the embodiment studied here in greater detail, the XC 470 (see FIG. 4 for context) comprises core specific multiplexers 620, each of which, when operating in the task image transfer mode, selects the updated image (from set 610) of the task identified 460 for processing by the core associated with a given multiplexer 620 to be transferred 480 to the working memory of that core 120.

Similar to the digital logic level description of the multiplexer 510 (in connection to FIG. 5), a possible implementation for functionality illustrated in FIG. 6, is such that the read data bus instance (from set 610) associated with application task ID #m (m is an integer between 0 and the number of application tasks supported by the system less 1) is connected to the data input #m of each multiplexer 620 instance, so that the identification (by the controller 140) of the active application task ID#460 for each of these core specific multiplexers 620 of XC 470 causes the XC 470 to connect each given core 120 of the array 115 in read mode to the segment 550 at memory 450 associated with its indicated 460 active application task. In an embodiment, controller 140 uses information from a core ID# addressed look-up-table per Table 5 format (shown in later in this specification) in supplying the next application task identifications 460 to the application core specific multiplexers 620 of XC 470.

Fabric Network for System Per FIG. 1: Inter-Task Communication Among Software Programs Executing on the Multi-Core Fabric of the System:

In addition to capabilities to activate, deactivate and relocate tasks 240 among cores 120 of a system 100 through the task image transfers as outlined above in connection with FIGS. 4-6, the system 100 enables the tasks 240 of the application programs 220 on the system to communicate with each other, e.g. to call and return to each other, passing input and output data (incl. pointers, for instance, to general memory and I/O facilities of system 100), between cores of the fabric 110. Such inter-task communication within an application program executing at system 100, in an embodiment of the invention, is handled by using logic, wiring and memory resources 400 per FIGS. 4-7 during the task processing times (i.e. when these XC and related resources are not being used for task image transfers).

According to the herein described embodiments, where XC 430 has dedicated multiplexers 510 and 720 for each application task configured to run on the multi-core processing fabric 110, in order to provide a write access from any core of the array 115 to any task specific segment 550 at the fabric memory 450, any number of, up to all, tasks executing on the multi-core fabric are able to concurrently write their inter-task communication information to memory segments of other tasks, in a particular implementation, at least within the scope 230 of their own application, as well as their own segment. Similarly, embodiments of the invention where XC 470 has a dedicated multiplexer 620 for each core of the fabric, in order to provide any core of the array 115 with a read access to any task specific segment 550 at memories 450, enable any number of, up to all, tasks of executing on the array 115 to concurrently read their inter-task communication information from memories 450, in a particular implementation, specifically, from their own segments 550 at the memories 450. Moreover, such embodiments further support any mix or match of concurrent writes and reads per above. Such non-blocking inter-task communications connectivity through the fabric network 400 facilitates high data processing throughput performance for the application programs 220 configured to run on the system 100.

Specifically, at a particular embodiment of the invention, the inter-task communication using the XCs 430, 470 and attached wiring shown in FIGS. 4-7 is supported among the set of tasks 230 of any given individual application program 220. Additionally, inter-application communication is supported at embodiments of system 100 through further networking, I/O and memory access means, including software based client/server and/or peer-to-peer communications techniques and networking and I/O ports as well as general memories of the cores 120 and the system 100. In a specific embodiment, the application-scope 230 inter-task communication is facilitated through providing the tasks 230 of any given application, while executing on the core array 115, with a write access 410 to the segments 550 of each others (including their own), in the memory 450, and a read access 480 to their own segments 550.

Following the image transfers of a task switchover, the new task executing on any given core has a connection through XC 470 to its memory segment 550, so that data specific to the new task can be read from the memory 450 to its assigned execution core. In an embodiment, each task periodically polls its memory segment 550 for any new information written for it by other tasks, and accordingly reads any such new information, where applicable transferring such information, or further information pointed by said new information written by other tasks (e.g. from a general memory of the system 100), to the local working memory at its processing core. In alternative embodiments, logic associated with memory segments 550 generates interrupt-type notifications to the core at that time associated with any given memory segment 550 following a write operation to such segment, for the task 240 executing on such core 120 to know that it has new inter-task communications to read at its memory segment 550. The receiving task controllable reading of data from its memory segment 550 is accomplished in a particular embodiment, together with the data access resources and procedures as discussed, by providing address line driven by the receiving core to its memory segment 550; in such an embodiment, the cores provide the addresses (of task specific segment 550 scope within memory 450) for the data entries to be loaded on the buses 610, 480 connected to the given core. While the connection from the buses 610 to buses 480, to connect each executing task's memory segment 550 to its processing core is connected through XC 470, the addresses for the executing tasks to read their memory segments 550 are connected from the processing cores of the tasks to their memory segments 550 (at least conceptually) through XC 430, which, using same control 420, connects also write access data buses from the cores to memories 450. In particular logic implementations where separate read and write addresses are used per each given task executing at any of the cores of the array, the read address is configured to pass through the XC 530 (and logic per FIG. 7) i.e. gets connected directly from the task specific multiplexer 510 to the memory segment 550 associated with the given task, while the write address gets further cross-connected through the XC 530.

In addition to the read access by any task to its own memory segment 550 (as described above), by providing write access by tasks of a given application 230 to each other's (incl. their own) memory segments 550 at the fabric memory 450, the tasks of any given application on system can communicate with each other in each direction. In an embodiment of the invention, such a write access is provided, in part, by having the control information 420, i.e. the ID# of the core assigned to any given application task, from controller 140 be applied to the XC 430 right after the completion of each run of the placement process 300 (incl. completion of task image backups), so that the updated information 420 is usable by the XC already during the task processing time of the CAPs rather than only at its end (when it is used to direct the task image back-ups). This causes that, while the tasks of any given application are processed at whatever set of cores within the array 115, their associated write-access connections 540 to memories 450 point to their current application task segment 550 at the memories 450. Moreover, when the task 240 ID#s of any given application 220, per the Table 4 format used for the info 420, comprise same common (at least conceptually most significant bits based) prefix, and when accordingly the task memory segments 550 of any given application 220 are within a contiguous memory range within the memory array 450, the set 525 (FIG. 5) of write access buses 540 of the tasks 230 of the same application collectively point to the collective memory range of that application within the memory 450. As such, by providing a further XC 530 between said set of write access buses 525 of a given application and the eventual write access buses 545 to the task segments 550 of the given application at memory 450, and by having the application tasks from their processing cores to provide the control to XC 530, along with their write access bus signals through their task specific multiplexers 510, write access by any task of an application to the memory segments 550 of all tasks of the same application is accomplished. Note that according the embodiments described here in at detail level, there is one XC 530 per each application 220 supported by the system 100.

At the task memory image transfer time for cores subject to task switchover, the XCs 530 are to be controlled to pass through the image transfer from any core to the memory segment 550 dedicated to the task for which the given core was assigned to prior the switchover. In an embodiment, this image transfer time control 535 for XCs 530 is provided by the controller 140. Alternatively, it can be provided by the application tasks, using same mechanisms as during the task processing time, i.e., during the time periods outside the task image transfer times for any given core (described in the following).

Figure 7:
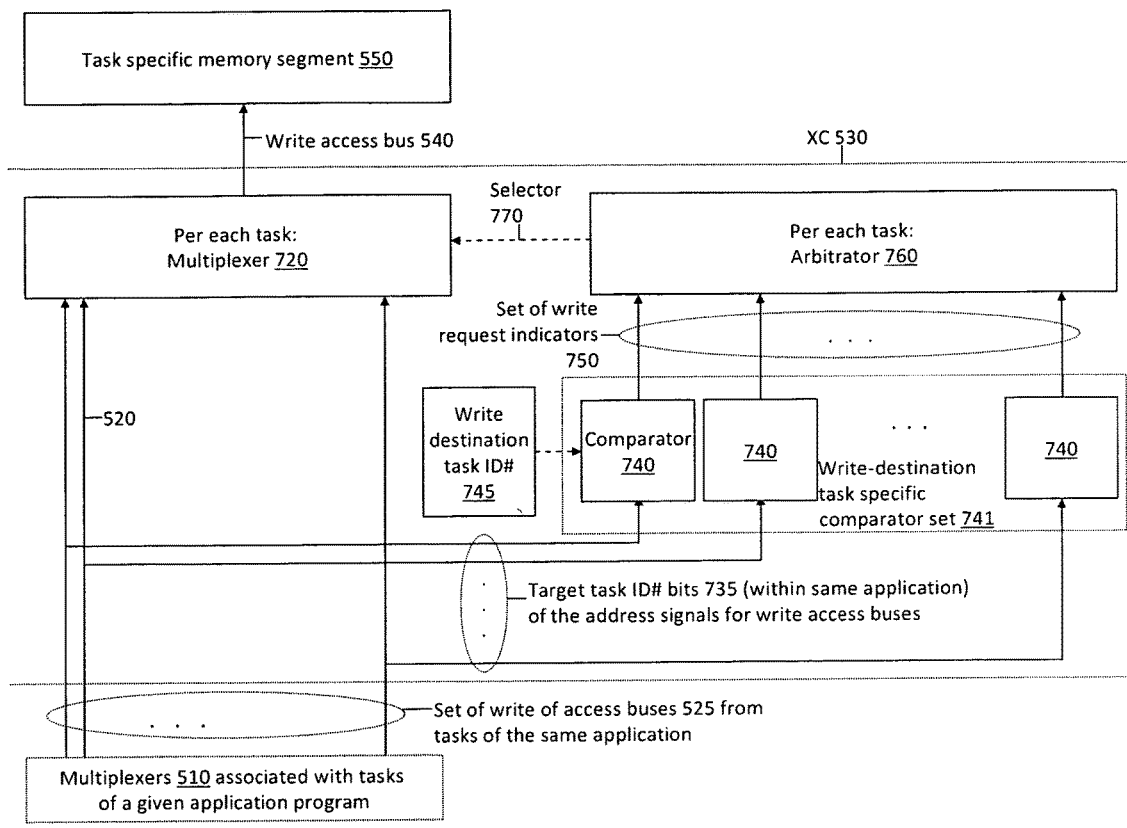
FIG. 7 presents at further level of detail an embodiment of logic functionality for the subsystem per FIG. 5, concerning a capability for tasks of an application program to write information to each other's, including their own, memory segments within the multi-core fabric.

During such task processing times, and while a task at a given core has an active write request or operation ongoing, the bus 410 from each core through the multiplexers 510 to the XC 530 identifies, among other relevant write access signals, at least during times of active write request or operation, the destination task of its write; this identification of the same-application-scope task ID# can be provided e.g. as specified bit range 735 (FIG. 7) within the (write) address bits of buses 410 and 525. In an embodiment, as illustrated in FIG. 7, each application 220 specific XC 530 comprises a set of task 240 specific multiplexers 720 that are controllable through bus 520 instance specific comparators 740, each of which identifies 750 whether its associated task specific bus 520 instance is requesting a write access to the memory segment 550 dedicated to the task that a given multiplexer 720 instance is specific to. Each comparator 740 instance sets its output 750 to active state, e.g. logic high, if its input instance among set 735 matches the ID# of the task 745 that a given set of comparators 740 are associated with (which is the same task that the multiplexer 720 and the arbitrator 760 to which the outputs 750 from the given set 741 of comparators connect to are associated with). Each of the task specific set 741 of comparators 740 has its unique task ID# input 745; in an embodiment, there is one write-source task specific comparator among each write-destination task specific set 741 for each task of the application program that the multiplexer 720 serves. Within the context of FIG. 7, the sufficient scope of the write-destination task ID#745 is that of intra-application; here the write-destination task ID#745 is to identify one task 240 of among the set of tasks 230 of a given application program 240 that logic and memory resources per FIG. 7 are specific to. I.e., per any given set of comparators 741 associated with a particular write destination specific multiplexer instance 720, one common task ID#741, identifying that particular write destination task within its application, is sufficient. Note also that the set of buses 525 of a given application 220 will reach to the multiplexer 720 instance of each task 240 of the given application, even though, for the sake of clarity of illustration, in FIG. 7 only one of such task-specific multiplexers 720 of an XC 530 of the given application is shown.

Among the writing-source task specific bus 520 instances identified by their comparators 740, e.g. by high logic state on signal 750 driven by a given source task specific comparator instance, as requesting a write to the memory segment 550 of the task for which the given multiplexer 720 is dedicated to, an arbitrator logic module 760 will select 770 one bus 520 instance at a time for carrying out its write 540. The arbitrator 760 asserts a write accepted signal to the execution source core of the task so selected to carry out its write, while any other cores, in an embodiment among those requesting a write simultaneously, will get a write request declined signal from the arbitrator 760. While not shown in FIG. 7 for clarity of illustration of main functionality involved, the write accepted/rejected signals for any given tasks executing at the cores of the array 115, according to an embodiment of the invention, are connected from the arbitrators 760 associated with tasks 230 of their application program through the XC 470, along with the buses 610, 480 to their assigned cores; the write requested accepted/rejected indications from all tasks 230 of a given application become part of the bus 610 instance for any task (FIG. 6), and thus any given task executing on any core will continuously get the write accepted/rejected indications from all other tasks of its local application through its receive bus 480 from the module 400.

In an embodiment, the arbitrator 760 will choose the core accepted for write 540, in case of multiple simultaneously requesting cores, by using a linearly revolving (incrementing the selected task ID# by one and returning back to 0 from highest task ID#, while skipping any tasks not requesting a write) selection algorithm; in case of a single requesting core, the arbitrator simply accepts directly any such singular write request. Moreover, in order to prevent any single source task, through otherwise potentially long lasting writes 540 to a given destination task memory segment 550, from blocking other tasks from their fair time share of write 540 access to the given destination task's memory, certain embodiments of module 760 will run their source task selection algorithm periodically (e.g. every 64 or 1024 clock cycles or such) and, in case of a presence of multiple tasks with an active write request, chose a revolving new task (of the tasks requesting a write) accepted for write access following successive runs of its writing task selection algorithm.

In various embodiments of the invention, software of the application tasks 240 supports a protocol for exchanging information between themselves through the task specific segments 550 at the fabric memory array 450, so that multiple tasks are able to write successively to a memory segment 550 of a given task without overwriting each other's info, and so that the receiving task is able to keep track of any unread information written by any other task to its memory segment 550. According to one such an embodiment, each task specific memory segment 550 provides a reserved inter-task communications write and read memory space, referred to as a spool area, along with a writing control register or set of such registers at specified address (es) for the writing and reading tasks to keep track of where to write and read new information within the spool area. In certain scenarios, the spool area is divided into writing task specific sub-segments. In such scenarios, each writing task, being configured (e.g. through its task ID# within its application program) the location of its sub-segment within the spool area, can itself keep track of to which address to write its next block of information to a given receiving task's spool area, without needing a read access to any receiving task's memory segment 550. In addition, the writing tasks, after completing a write to a receiving task's spool area, in the herein discussed embodiments, update their related write control register at the receiving task's memory segment 550, to inform the receiving task of the new write operation (e.g. the address up to which there is new information to be read). When each writing task uses its spool area at receiving task's memory segment 550 as a circular buffer, with the buffer write address counter returning to zero after reaching the maximum length configured for their spool sub-segment, one way of preventing any given writing task from overwriting any unread information at its spool sub-segment is that each receiving task repeatedly writes for its writing tasks (using the above described inter-task communication mechanism) the maximum address up to which any given writing task is presently allowed to write at the receiving task's spool, according to until what address the receiving task has read the spool sub-segment in question. Through this method the writing task is also able to keep track of how much of its written information the receiving task has confirmedly read by any given time. As discussed above, in certain embodiments, the tasks repeatedly read the write control registers of their spool areas, to know whether and where they have newly written information from other tasks to read. In alternative embodiments, changes to write control registers cause read request notifications (e.g. through processor interrupt mechanism) from memory segments 450 to their associated cores 120 of the array 115.

Regarding descriptions of the drawings herein, note that in various embodiments, the modules and steps of the on-chip network 400 as well as the controller 140 and process 300 providing control for the fabric network 400 can be implemented using various combinations of software and hardware logic, and for instance, various memory management techniques can be used to pass (series of) pointers to the actual memories where the data elements of concern are available, rather than passing directly the actual data, etc.

Module-Level Implementation Specifications for the Application Task to Core Placement Process:

While module level logic specifications were provided in the foregoing for embodiments of the on-chip network 400, such details for embodiments of the steps of the process 300 (FIG. 3) are described in the following. In an embodiment of the invention, the process 300 is implemented by hardware logic in the controller module 140 of a system per FIG. 1.

In the herein studied operating scenarios, objectives for the core allocation algorithm 310 include maximizing the system core utilization (i.e., minimizing core idling so long as there are ready tasks), while ensuring that each application gets at least up to its entitled (e.g. a contract based minimum) share of the system core capacity whenever it has processing load to utilize such amount of cores. In the embodiment considered herein regarding the system capacity allocation optimization methods, all cores 120 of the array 115 are allocated on each run of the related algorithms 300. Moreover, let us assume that each application configured for the given multi-core system 100 has been specified its entitled quota 317 of the cores, at least up to which quantity of cores it is to be allocated whenever it is able to execute on such number of cores in parallel; typically, sum of the applications' entitled quotas 317 is not to exceed the total number of cores in the system. More precisely, according to the herein studied embodiment of the allocation algorithm 310, each application program on the system gets from each run of the algorithm:

(1) at least the lesser of its (a) entitled quota 317 and (b) Core Demand Figure (CDF) 130 worth of the cores (and in case (a) and (b) are equal, the 'lesser' shall mean either of them, e.g. (a)); plus (2) as much beyond that to match its CDF as is possible without violating condition (1) for any application on the system; plus (3) the application's even division share of any cores remaining unallocated after conditions (1) and (2) are satisfied for all applications 210 sharing the system 100.

In an embodiment of the invention, the cores 120 to application programs 220 allocation algorithm 310 is implemented per the following specifications:

(i) First, any CDFs 130 by all application programs up to their entitled share 317 of the cores within the array 115 are met. E.g., if a given program #P had its CDF worth zero cores and entitlement for four cores, it will be allocated zero cores by this step (i). As another example, if a given program #Q had its CDF worth five cores and entitlement for one core, it will be allocated one core by this stage of the algorithm 310.

(ii) Following step (i), any processing cores remaining unallocated are allocated, one core per program at a time, among the application programs whose demand 130 for processing cores had not been met by the amounts of cores so far allocated to them by preceding iterations of this step (ii) within the given run of the algorithm 310. For instance, if after step (i) there remained eight unallocated cores and the sum of unmet portions of the program CDFs was six cores, the program #Q, based on the results of step (i) per above, will be allocated four more cores by this step (ii) to match its CDF.

(iii) Following step (ii), any processing cores still remaining unallocated are allocated among the application programs evenly, one core per program at time, until all the cores of the array 115 are allocated among the set of programs 210. Continuing the example case from steps (i) and (ii) above, this step (iii) will be allocating the remaining two cores to certain two of the programs. In particular embodiments, the programs with zero existing allocated cores, e.g. program #P from step (i), are prioritized in allocating the remaining cores at the step (iii) stage of the algorithm 310.

Moreover, in a certain embodiments, the iterations of steps (ii) and (iii) per above are started from a revolving application program within the set 210, e.g. so that the application ID # to be served first by these iterations is incremented by one (and returning to the ID #0 after reaching the highest application ID#) for each successive run of the process 300 and the algorithm 310 as part of it. Moreover, embodiments of the invention include a feature by which the algorithm 310 allocates for each application program, regardless of the CDFs, at least one core once in a specified number (e.g. sixteen) of process 300 runs, to ensure that each application will be able to keep at least its CDF 130 input to the process 300 updated.

According to descriptions and examples above, the allocating of the array of cores 115 according to the embodiments of the algorithm 310 studied herein in detail is done in order to minimize the greatest amount of unmet demands for cores (i.e. greatest difference between the CDF and allocated number of cores for any given application 220) among the set of programs 210, while ensuring that any given program gets at least its entitled share of the processing cores following such runs of the algorithm for which it demanded 130 at least such entitled share 317 of the cores.

Once the set of cores 115 are allocated 310 among the set of applications 210, specific core 120 instances are assigned to each application 220 that was allocated one or more cores on the given core allocation algorithm run 310. In an embodiment, one schedulable 240 task is assigned per one core 120. Objectives for the application task to core placement algorithm 330 include minimizing the total volume of tasks to be moved between cores (for instance, this means that tasks continuing their execution over successive CAPs will stay on their existing core). In certain embodiments of the invention, the system controller 140 assigns the set of cores (which set can be zero at times for any given application) for each application, and further processes for each application will determine how any given application utilizes the set of cores being allocated to it. In other embodiments, such as those studied herein in further detail, the system controller 140 also assigns a specific application task to each core.

To study details of an embodiment of the process 300, let us consider the cores of the system to be identified as core #0 through core #(N−1), wherein N is the total number of pooled cores in a given system 100. For simplicity and clarity of the description, we will from hereon consider an example system under study with a relatively small number N of sixteen cores. We further assume here a scenario of relatively small number of also sixteen application programs configured to run on that system, with these applications identified for the purpose of the description herein alphabetically, as application #A through application #P. Note however that the invention presents no actual limits for the number of cores, applications or task for a given system 100. For example, instances of system 100 can be configured a number of applications that is lesser or greater than (as well as equal to) the number of cores.

Following the allocation 310 of the cores among the applications, for each active application on the system (that were allocated one or more cores by the latest run of the core allocation algorithm 310), the individual ready-to-execute tasks 240 are selected 320 and mapped 330 to the number of cores allocated to the given application.

The task selection 320 step of the process 300 produces, for each given application of the set 210, lists 325 of to-be-executing tasks to be mapped 330 to the subset of cores of the array 115. Note that, at least in some embodiments, the selection 320 of to-be-executing task for any given active application (such that was allocated 310 at least one core) is done, in addition to following of a chance in allocation 310 of cores among applications, also following a change in task priority list 135 of the given application, including when not in connection to reallocation 310 of cores among the applications. At least in such embodiments, the active task to core mapping 330 is done logically individually for each application, however keeping track of which cores are available for any given application, e.g. by running the mapping algorithm for application at a time, or first assigning for each application their respective subsets of cores among the array 115 and then running the mapping 330 in parallel for each application with new tasks to be assigned to their execution cores.

In the embodiments discussed herein in greater detail, the task to core mapping algorithm 330 for any application begins by keeping any continuing tasks, i.e., tasks selected to run on the array 115 both before and after the present task switchovers, mapped to their current cores also on the next allocation period. After that rile is met, any newly selected tasks for the application are mapped to available cores. Specifically, assuming that a given application was allocated P (a positive integer) cores beyond those used by its continuing tasks, P highest priority ready but not-yet-mapped tasks of the application are mapped to P next available (i.e. not-yet-assigned) cores within the array 115 allocated to the application. In case that any given application had less than P ready tasks, the highest priority other (e.g. waiting, not ready) tasks are mapped to the remaining available cores among the number (P) cores allocated to the given application; these other tasks can thus directly begin executing on their assigned cores once they become ready: Note further than, in an embodiment, the placing of newly selected tasks, i.e. selected tasks of applications beyond the tasks continuing over the switchover transition time, is done by mapping such yet-to-be-mapped application tasks in incrementing application task ID# order to available cores in incrementing core ID# order.

Summary of Process Flow and Information Formats Produced and Consumed by Main Stages of the Application Task to Core Mapping Process:

The production of updated mappings 460, 420 between selected application tasks 120 and the processing cores 120 of the system 100 by the process 300 (FIG. 3, implemented by controller 140 in FIG. 1) from the Core Demand Figures (CDFs) 130 and task priority lists 135 of the applications 220 (FIG. 2), as detailed above with module level implementation examples, proceeds through the following stages and intermediate results (in reference to FIG. 3), according to an embodiment of the invention:

Each application 220 produces its CDF 130, e.g. an integer between 0 and the number of cores within the array 115 expressing how many concurrently executable tasks 240 the application presently has ready to execute. A possible implementation for the information format 130 is such that logic with the core allocation module 310 periodically samples the CDF bits from the segment 550 at memory 450 dedicated to the (root process) task #0 of each application for and, based on such samples, forms an application ID-indexed table (per Table 1 below) as a 'snapshot' of the application CDFs to launch the process 300. An example of the format of the information 130 is provided in Table 1 below—note however that in the hardware logic implementation, the application ID index, e.g. for range A through P, is represented by a digital number, e.g., in range 0 through 15, and as such, the application ID # serves as the index for the CDF entries of this array, eliminating the need to actually store any representation of the application ID for the table providing information 130:

TABLE 1

| Application ID index | CDF value |
|---|---|
| A | 0 |
| B | 12 |
| C | 3 |
| ... | ... |
| P | 1 |

Regarding Table 1 above, note that the values of entries shown are simply examples of possible values of some of the application CDFs, and that the CDF values of the applications can change arbitrarily for each new run of the process 300 and its algorithm 310 using the snapshot of CDFs.

Based at least in part on the application ID # indexed CDF array 130 per Table 1 above, the core allocation algorithm 310 of the process 300 produces another similarly formatted application ID indexed table, whose entries 315 at this stage are the number of cores allocated to each application on the system, as shown in Table 2 below:

TABLE 2

| Application ID index | Number of cores allocated |
|---|---|
| A | 0 |
| B | 6 |
| C | 3 |
| ... | ... |
| P | 1 |

Regarding Table 2 above, note again that the values of entries shown are simply examples of possible number cores of allocated to some of the applications after a given run on the algorithm 310, as well as that in hardware logic this array 315 can be simply the numbers of cores allocated per application, as the application ID# for any given entry of this array is given by the index # of the given entry in the array 315.

The application task selection sub-process 325, done in embodiments of the process 300 individually, e.g. in parallel, for each application of the set 210, uses as its inputs the per-application core allocations 315 per Table 2 above, as well as priority ordered lists 135 of ready task IDs of any given application. Each such application specific list 135 has the (descending) task priority level as its index, and the intra-application scope task ID# as the value stored at each such indexed element, as shown in Table 3 below—notes regarding implicit indexing and non-specific examples used for values per Table 1-2 apply also for Table 3:

TABLE 3

| Task priority index # -- application internal (lower index value signifies more urgent task) | Task ID # (points to start address of the task-specific sub-range 550 within the per-application dedicated address range at memory 450) |
|---|---|
| 0 | 0 |
| 1 | 8 |
| 2 | 5 |
| ... | ... |
| 15 | 2 |

In an embodiment, each application 220 of the set 210 maintains its task priority list 135 per Table 3 at specified address at its task #0 segment 550 at memory 450, from where logic at controller 140 retrieves this information to be used as an input for the active task selection sub-process 320, which produces per-application listings 325 of selected tasks. Based at least in part on the application specific active task listings 325, the core to application task assignment algorithm module 330 produces a core ID# indexed array 420 indexed with the application and task IDs, and provides as its contents the processing core ID (if any), per Table 4 below:

TABLE 4

| Application ID -- MSBs of index | Task ID (within the application of column to the left) -- LSBs of index | Processing core ID (value 'N' here indicates that the given task is not presently selected for execution at any of the cores) |
|---|---|---|
| A | 0 | 0 |
| A | 1 | N |
| ... | ... | |
| A | 15 | 3 |
| B | 0 | 1 |
| B | 1 | N |
| ... | ... | |
| B | 15 | 7 |
| C | 0 | 2 |
| ... | ... | ... |
| P | 0 | 15 |
| ... | ... | |
| P | 15 | N |

Finally, by inverting the roles of index and contents from Table 4, an array 460 expressing to which application task ID# each given core of the fabric 110 got assigned, per Table 5 below, is formed. Specifically, Table 5 is formed by using as its index the contents of Table 4 i.e. the core ID numbers (other than those marked 'N'), and as its contents the application task ID index from Table 4 corresponding each core ID#:

TABLE 5

| Core ID index | Application ID | Task ID (within the application of column to the left) |
|---|---|---|
| 0 | P | 0 |
| 1 | B | 0 |
| 2 | B | 8 |
| ... | ... | ... |
| 15 | N | 1 |

Regarding Tables 4 and 5 above, note that the symbolic application IDs (A through P) used here for clarity will in digital logic implementation map into numeric representations, e.g. in the range from 0 through 15. Also, the notes per Tables 1-3 above regarding the implicit indexing (i.e., core IDs for any given application ID entry are given by the index of the given entry, eliminating the need to store the core IDs in this array) apply for the logic implementation of Tables 4 and 5 as well.

In hardware logic implementation the application and the intra-application task IDs of Table 5 can be bitfields of same digital entry at any given index of the array 460; the application ID bits can be the most significant bits (MSBs) and the task ID bits the least significant (LSBs), and together these, in at least one embodiment, form the start address of the active application task's address memory range in the memory array 450 (for the core with ID# equaling the given index to application task ID# array per Table 5).

By comparing Tables 4 and 5 above, it is seen that the information contents at Table 4 are the same as at Table 5; the difference in purposes between them is that while Table 5 gives for any core 120 its active application task ID#460 to process, Table 4 gives for any given application task its processing core 420 (if any at a given time). As seen from FIGS. 4-6, the Table 5 outputs are used to configure the core specific multiplexers 620 at XC 470, while the Table 4 outputs are used to configure the application task specific multiplexers 510 at XC 430.

Note further that, according to a particular embodiment of process 300, when the task to core placement module 330 gets an updated list of selected tasks 325 for one or more applications 220 (following a change in either or both of core to application allocations 315 or task priority lists 135 of one or more applications), it will be able to identify from Tables 4 and 5 the following:

I. The set of activating, to-be-mapped, applications tasks, i.e., application tasks within lists 325 not mapped to any core by the previous run of the placement algorithm 330. This set I. can be produced by taking those application tasks from the updated selected task lists 325 Table 4 whose core ID# was 'N' (indicating task not active) in the latest Table 4;

II. The set of deactivating application tasks, i.e., application tasks that were included in the previous, but not in the latest, selected task lists 325. This set II. can be produced by taking those application tasks from the latest Table 4 whose core ID# was not 'N' (indicating task active) but that were not included in the updated selected task lists 325; and III. The set of available cores, i.e., cores 120 which in the latest Table 5 were assigned to the set of deactivating tasks (set II. above).

The placer module 330, according to such particular embodiment, will use the above info to map the active tasks to cores of the array in a manner that keeps all the continuing tasks executing on their present cores, thereby maximizing utilization of the core array 115 for processing the (revenue generating) user applications 220. Specifically, in one such embodiment, the placement algorithm 330 maps the individual tasks 240 within the set I. of activating tasks in their increasing application task ID# order for processing at core instances within the set III. of available cores in their increasing core ID# order.

In alternative embodiments, the allocation 310 stage of the process 300 can, in addition to determining the number of cores from the array 115 to be allocated for each given application 220, determine also the subsets of specific cores instances assigned for the individual applications, and pass that core to application assignment info along to the remaining, including task placement 330, stages of the process 300. In such alternative embodiments, the stage 310 is to keep track of the available core instances than can be reallocated between applications, while the remaining stages of the process (incl. task to core placement) can be done completely independently, e.g. in parallel (incl. concurrently), for each application among the set 210.

Revenue Generation and Cost-Efficiency Improvement Techniques for Embodiments of System 100

Embodiments of the invention involve techniques for maximizing either or both of the following: i) the revenue over a period of time (e.g. year) for the compute capacity provider operating a given platform 100 (per FIG. 1) of a certain total cost, and ii) the on-time data processing throughput per unit cost for the users of a given platform 100. According to various embodiments, such as one illustrated in FIG. 8, these techniques have one of more of the following type of objectives:

1) Maximizing, at given billing rates for core entitlements, the number of core entitlements 317 sold for user contracts supported by a given platform 100. A core entitlement 317 (CE) herein refers to the number of cores 120 up to which amount of cores of the array 115 a given user program 220 is assured to get its core demand figures (CDFs) 130 met by core allocations 315 on successive runs of the algorithm 310.
2) Maximizing, at given billing rates for demand-based core allocations for a billing assessment period (BAP), the total volume of demand-based core allocations for the programs 210 configured for a given platform 100. Herein, a demand based core allocation (DBCA) refers to an amount of cores 120 allocated 315 to a program 220 to meet that program's CDF 130 on the given BAP (i.e., any cores allocated for a program beyond the CDF of the program are not counted as demand based core allocations). In an embodiment, DBCA for a given program 220 on a given core allocation period (CAP) is taken as the lesser (or any equal) of the CDF 130 and allocated core count 315 of the program.

These objectives generally reflect the utility for the users running their programs 210 on a platform 100; the users are assumed to perceive value in, and be willing to pay for, assured access to their desired level of data processing capacity of a given compute platform 100 and/or their actual usage of the platform capacity. Accordingly, either or both of the above objectives 1) and 2) are among principal factors driving the revenue for the operator of the given platform 100.

Figure 8:
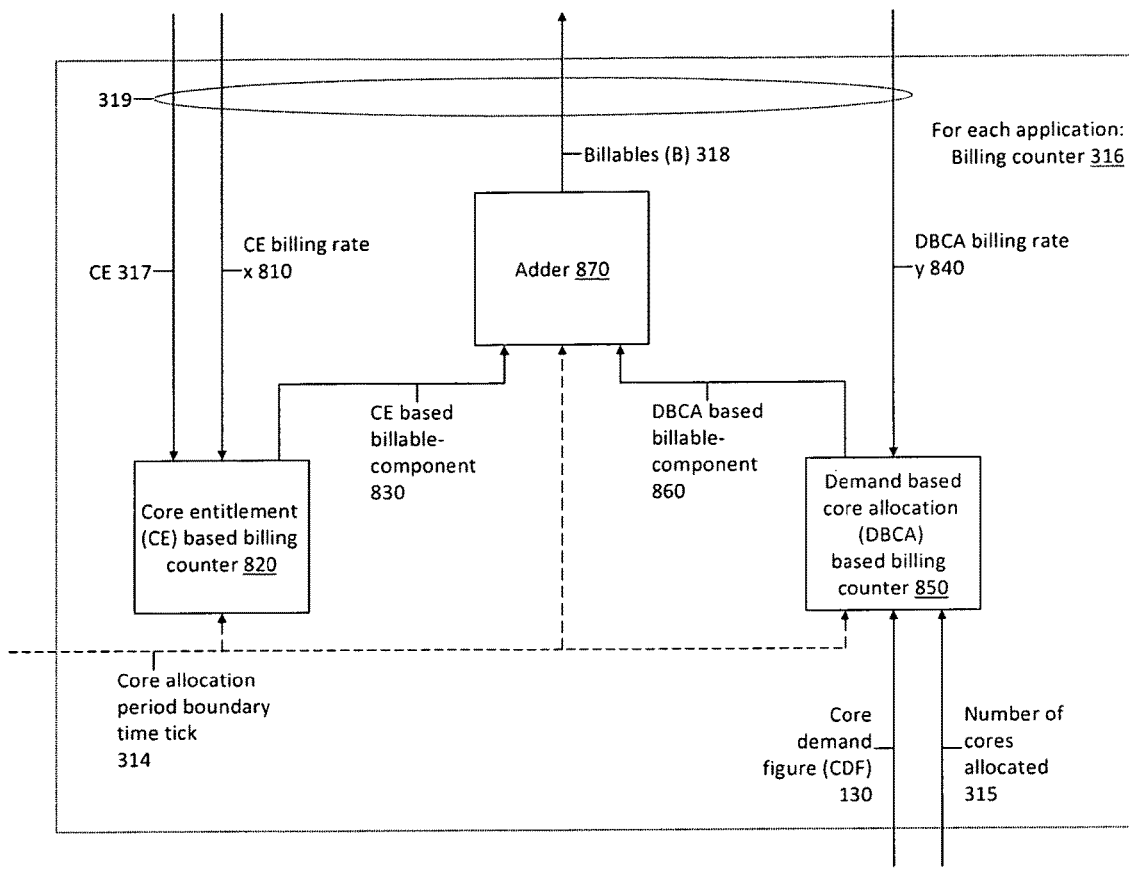
FIG. 8 illustrates, in accordance with an aspect of the invention, a billing subsystem for a multi-user parallel processing platform of FIG. 1.

According to an embodiment of the invention per FIG. 8, the billables (B) 318 for the operator of the platform 100 from a compute capacity service contract with a user is based on the following equation: $B = x*CE + y*DBCA$ (Equation 1), wherein CE stands for core entitlement 317 for the user, DBCA stands for the (average) amount of cores allocations to that user's program to meet its CDFs for the CAPs during the contract time period in question (e.g., 1 month) and x and y are billing rates per the contract terms that convert CE and DBCA into monetary figures.

Note that one advantage of this billing method is that a portion (i.e. the term $y*DBCA$; in FIG. 8, element 860) of the cost of the utility computing service for a user running its program 220 on the platform 100 is based on the CDFs 130 of the user's program (to the degree that CDFs are met by core allocations 315). Therefore, each user of the compute capacity service provided with a platform 100 has an economic incentive to configure its programs 220 so that they eliminate any CDFs beyond the number of cores that the given program 220 is actually able to utilize at the given time. The user applications 210 thus have the incentive to not automatically demand 130 at least their CE worth of cores irrespective of on how many cores the given program is able to execute on in parallel at any given time. This incentive leads to increasing the average amount of surplus cores for runs of the core allocation algorithm 310 i.e. cores that can be allocated in a fully demand driven manner (rather than in a manner to just meet the CDFs 130 by each application for at least their CE figure worth of cores). Such maximally demand driven core allocation (which nevertheless allows guaranteeing each user application an assured deterministic minimum system capacity access level whenever actually demanded) facilitates providing maximized data processing throughput per unit cost across the set 210 of user applications dynamically sharing the platform 100.

Moreover, in certain embodiments, either or both of the billing rates x (element 810 in FIG. 8) and y (element 840 in FIG. 8) for Equation 1 can be specified in the contract terms to vary over time. In a particular embodiment, the term $x*CE$ (element 830 in FIG. 8) takes the form of a sum such as $x_1*CE_1 + x_2*CE_2$, wherein $x_1$ is the billing rate for a core entitlement during specified premium businesses hours (e.g. Monday-Friday 9 am-5 pm at the local time zone of the given platform or user) and $x_2$ the billing rate for a core entitlement outside the premium business hours, while $CE_1$ and $CE_2$ are core entitlements for the given contract for the premium and non-premium hours, respectively. Naturally, in various embodiments, there can be more than just two time phases with their respective billing rates. For instance, in addition to premium pricing during the business hours, also evening hours 5 pm-1 am could have a different billing rate than 1 am-9 am, and so forth, depending on the popularity of the compute capacity usage during any given hours of the day. Similarly, different days of the week, special calendar days etc. can have different billing rates, e.g. based on expected popularity of compute capacity on such days. Naturally, this discussion applies also the for the coefficient y of the term $y*DBCA$ (element 860 in FIG. 8) in Equation 1.

According to an embodiment of the invention per FIG. 8 (see also context from FIGS. 3 and 1), digital hardware logic within the controller module 140 functions as a billing counter 316 for the contracts supported by a given platform 100. Such a billing counter logic use the CDFs 130 and core allocation figures 315 per each user program 220 to keep track (in FIG. at submodule 850) of the series of DBCA figures for each program 220 for successive capacity allocation period instances (demarcated by notifications of CAP boundaries 314, e.g. after completion of core allocations by module 310), and accordingly the logic of module 316 multiplies (in FIG. also at submodule 850) such series of contract specific DBCAs with the contract-specified billing rates y 840 (applicable at the time of any given DBCA occurrence) to form the billing components 860 (in Equation 1) attributable to the demand based core usage for the users of the programs. Certain embodiments of such hardware billing counters 316 further similarly compute (in FIG. 8 at submodule 820) and add (in FIG. 8 at submodule 870) to the former (i.e. the information flow 860 in FIG. 8) also the core entitlement based billing components 830 to form the billables 318 for the user contracts for the given contract period. Note that for simplicity and clarity, FIG. 8 presents the billing counter hardware logic modules as serving a single user application 220. In certain embodiments, at least some of these logic resources can be time shared to serve multiple, up to all, user programs 210 on a given platform 100, while in alternative embodiments there can be a dedicated billing counter instance 316 per each user program configured for a given platform 100.

In an alternative logic implementation for the billing subsystem functionality discussed herein, in addition to the billing rate values, the signals 810, 840 provide notifications of transitions of contract time phases at which the CE and DBCA billing rates get new values. In such a logic implementation, DBCA based billing counter 850 counts an average number of cores allocated to a given user program 220 over the core allocation periods (CAPs) during a given billing assessment period (BAP), for which the DBCA billing rate remained a constant, and multiplies this average DBCA amount with a total DBCA billing rate per core applicable for that BAP. Similarly, according to this logic implementation principle, the CE based billing counter 820 counts the average CE level for the given program (or simply takes any constant CE level for the time phase in question) for a given BAP for which the CE billing rate remains a constant, and multiplies that average (or simply constant) CE level with a total CE billing rate applicable for that BAP. In such a logic implementation, the adder 870 accumulates the series of billable components 860, 830 so produced for such BAPs of constant billing rates to form the billables 318 for the given program. For context, note that in the envisioned computing service contract scenarios with platforms 100, the typical CAPs are expected to consist of tens to thousands of processing logic clock cycles, thus lasting for microseconds or less, while the BAPs, at boundaries of which the billing rates 810, 840 change, may last from minutes to hours, comprising several millions to billions of CAPs. Finally, the contract invoicing periods may be calendar months, thus typically comprising tens to hundreds BAPs.

Furthermore, compute capacity provider operating a platform 100 can offer different types of CE time profiles for different application 220 types. For instance, a service provider operating a platform 100 could sell four basic contract types with differing CE time profiles per examples of contract plans A, B, C and D in Table 6 below:

TABLE 6

| | | Plan | | | | |
|---|---|---|---|---|---|---|
| | | A | B | C | D | Sum of CEs = |
| | | | Contract type | | | |
| | | enterprise | entertainment | batch | always on | cores needed for the below contract mix |
| | Number of contracts | 1 | 3 | 1 | 2 | |
| CEs - time profiled: | business hours | 8 | 2 | 0 | 1 | 16 |
| | evening hours | 1 | 4 | 0 | 1 | 15 |
| | night hours | 0 | 2 | 8 | 1 | 16 |
| | Max during 24 h: | | | | | 16 |
| CEs - flat: | any hour | 8 | 4 | 8 | 1 | 30 |
| Efficiency gain of time profiled CEs vs. flat CEs: | | | | | | 87.5% |

As illustrated in Table 6, the capability per the invention to allow configuring compute capacity contracts with differing CE time profiles, particularly contract types with non-overlapping CE peaks on a given platform 100, can facilitate both improving the computing cost-efficiency for the users of the compute service provided through the platform as well as increasing the revenues that the compute capacity service provider is able to achieve with the platform of a certain cost of ownership. In embodiments of the invention, either or both of the CE and DBCA billing rates can be set for different values on the different billing assessment periods (BAPs) of the day, week, month, etc, in order to optimally spread the user program processing load for a given platform 100 over time, and thereby, maximize the cost efficiency for the users of the computing service provided with the given platform and/or the revenue generation rate for the service provider operating the platform. For instance, in an example scenario, the CE billing rate on business days could be $0.08 per a core for the BAP of the business hours, $0.04 for the BAP of the evening hours, and $0.01 for the BAP of night hours, while DBCA billing rate, per the average number of demand based cores allocated to a given program over the eight hours of these daily BAPs, could be $0.04 for the business, $0.02 for evening, and $0.01 for night BAPs. In various other scenarios, these daily BAP billing rates can be set to any other values, and can have differing values on different calendar days, as well as different week days (e.g. Monday-Friday versus Saturday-Sunday) can have non-uniform BAP phasing (e.g. Saturday-Sunday could replace the business hour BAP of Monday-Friday with 'extended' evening hour BAP), etc.

With the example values of Table 6 for a mix (or 'basket' 210) of enterprise, entertainment (including news etc.), batch job (overnight block data processing), and always-on type of applications 220, it can be seen that the capability per the invention to configure applications for a given system 100 with different CE time profiles can allow the service provider operating the given system 100 to support a given set 210 of applications, with their collective CE requirements, with a significantly reduced system core 120 count, i.e., with a lower cost base for the revenues generated through supporting the given set of user applications 210. With the numerical example shown in Table 6, this system core utilization efficiency gain with time-profiled contract CEs compared to flat CEs enables a reduction from 30 to 16 cores needed for the provided mix of user contracts. In turn, this compute resource utilization efficiency gain with time profiled CEs reduces to cost of revenue for the utility computing service provider by an accordant factor. Put differently, the service provider's revenue per unit cost of the service provided (driven by the number of cores needed to support given set 210 of contracts) is multiplied accordingly.

Note that in the discussion herein regarding the example of Table 6, also the flat CE reference that time profiled CE contracts are compared with is assumed to be implemented on a platform 100 that supports the application load adaptive core allocation as described here in reference to FIGS. 1-7. It should be noted that the capability of the described embodiments of the invention to support such dynamic compute resource allocation with contract specified minimum system access level guarantees (when so demanded) is not supported by conventional computing systems, and as such, the contracts supported with a system 100, i.e. contracts with the capability to burst to up to the full system core capacity while having a minimum assured level of access to the shared multi-core system capacity, are, expected to have a higher market value than conventional types of contracts with either only a dedicated share of given compute system capacity (but without a capability to burst beyond the dedicated cores) or a capability to burst (but without a minimum core count based access level that the user contract would be guaranteed to get whenever needed). Moreover, regarding Table 6, please also note that CE level of zero (0) does not in the herein discussed embodiments mean that the given contract type would not allow the application under that contract to execute on its host platform 100 during the hours in question; instead, CE of 0 indicates that, while the application is not guaranteed to have its CDFs met for up to any specified minimum core count, it will still in practice get its demand based fair of share of the cores allocated to it after the CDFs of set of the applications 210 up to their CE levels have been met (as described under "Module-level implementation specifications for the application task to core placement process" in the foregoing). In fact, at times when there are no other user application expressing a positive CDF at a given system 100, the application with CE of 0 can get its CDFs met all the way to the maximum core count of the array 115.

It shall also be understood that the 24 hour cycle for the CE time profiles per example of Table 6 here is merely to illustrate the capability per the invention to facilitate efficient combining of applications 220 with differing time-variable demand profiles for compute capacity into a shared compute capacity pool 110. In various implementation scenarios of the invention, there can be, for instance, further variants of plans within the basic contract types (e.g. plans A through D per Table 6) such that offer greater CE levels than the norm for the given base plan (e.g. plan A) at specified seasons or calendar dates of the year (either during the peak hours of the profile or throughout given 24 hour days) in exchange of lower CE levels than the norm for that base plan at other dates or seasons. Besides combining contracts with differing CE profiles within 24 h cycles as illustrated in Table 6 to dynamically share the same capacity pools 115, the invention also facilitates combining the seasonally differing variants of contracts within a given plan type (i.e. variants with non-coinciding seasonal peaks in their CE profiles) in the same capacity pools for further compute capacity utilization efficiency gains than the 8-hour phases shown in simplistic example of Table 6. Moreover, there can be variants of contract types within a given base plan that have finer time granularity in their CE profiles. For instance, among the contracts of type B, there can be a variant that offers greater than the standard CE level of the plan type for the night hours (e.g. 1 am-9 am) at specific timeslots (e.g. for a news casts at for 15 minutes at 6 am, 7 am, 8 am) in exchange of lower CE at other times during the night hours. Similarly, invention facilitates efficiently combining these type of variants of contracts within a given type with complementary peaks and valleys in their CE profiles also within a given phase of the 24 h cycle (e.g. the night hour phase). In particular embodiments, this type of combining of complementary variants (either seasonally, within 24 h cycles, etc.) of a given contract type takes place within the aggregate CE subpool of the contracts of the given base type. In the example shown in Table 6, this type of intra contract type combining of complementary variants can thus take place among the three contracts of type B, whose aggregate CE level is, for instance, during the night hours worth 3*2=6 cores for each CAP. Note that in embodiments of the invention with greater number of cores, there will normally be a greater number of applications of any given type sharing the system (and a greater subpool of CEs for each contract type) than what is shown in the intentionally simple, illustrative example of Table 6. Note also that the hardware logic based implementation of the user application billing counters 316 per FIG. 8, including the hardware logic based subcounter 820 for computing the CE based billables components for each given application for any given CAP, allows such embodiments of the invention to support, in practical terms, infinitely fine granularity CE time profiling for the contract types and their variants. Moreover, the capability to customize the contract and variant CE time profiles per their application specific demands for data processing capacity, with the hardware logic based fine granularity, determinism, accuracy and efficiency, enables the computing service provider operating a platform 100 to profitably sell highly competitively priced compute capacity service contracts, with the offered customizable CE time profiles accurately matching the processing capacity demands of any given application type. Similarly, the hardware logic based billing counters per FIG. 8 support in practical terms infinitely fine time granularity for CE pricing, through varying CE billing rate 810 values over time, even at granularity of individual CAPs if desired. With this capability of the invention, the users with less time sensitive programs 220, for instance among the programs of a given type within their base plan, have an incentive to shift their processing loads (at least in term of their core entitlements) to less busies times, to make room for CE peaks at popular times (e.g. for news casts at even hours 6-9 am) for the applications than can afford to pay for the more pricier CEs at such times of high demand for CE (assuming flat pricing). These low-overhead, accurate hardware logic based pricing adjustment, fine granularity billing and efficient compute platform sharing techniques per the discussed embodiments of the invention facilitate both maximizing the users' net value of the compute service being subscribed to as well as the service provider's profitability.

Benefits

According to the foregoing, advantages of the contract pricing based system 100 capacity utilization and application 220 performance optimization techniques include:

Increased user's utility, measured as demanded-and-allocated cores per unit cost, as well as, at least in certain cases, allocated cores per unit cost. Note that, compared to a case where the users would purely pay for their CEs, and as such have no direct incentive to ever demand 130 less than their CE 317 worth of cores, the billing method per the herein discussed embodiments of the invention wherein a portion of the billables per a user is based on the user's DBCAs 860 during the billing assessment period, incentivizes the users to economize on their CDFs 130 (e.g. not demand their CE worth of cores unless the given user application is able to effectively utilize at the time such number of cores), which, in turn, leads to there on average being more cores, per cost unit for a system 100, to be allocated to meet CDFs above any given user's CE, when the given user's program is actually able benefit from such bursting. Note also that cores allocated beyond the CDF of the user's application do not cost the user anything, and at least in some situations, a users' program 220 may be able to gain performance benefit from receiving a greater than number of cores allocated 315 to it than the number of cores it demanded. Thus the described embodiments of the invention increase the number of utilizable parallel execution core capacity received by any given user application on a platform 100 per unit of cost of the computing service provided through the platform.

Increased revenue generating capability for the service provider from CE based billables, per unit cost for a system 100, through the ability to offer contract plans with mostly or fully non-overlapping CE peaks (such as in case with plans A through D per example of Table 6). This enables increasing the service provider's operating cash flows with a system 100 of certain cost level. Also compared to a given computing service provider's revenue level, this method reduces the provider's cost of revenue, allowing the provider to offer more competitive contract pricing, by passing on at least a portion of the savings to the customers (also referred to as users) running programs 220 on the system 100, thereby further increasing the customer's utility of the computing service subscribed to (in terms of compute capacity received when needed, specifically, number of cores allocated and utilized for parallel program execution) per unit cost of the service. Consequently, this technique for optimally combining user contracts with complementary CE time profiles on a given platform 100 allows the service provider operating the platform 100 to increase the competitiveness of its compute capacity service offering among the prospective customers in terms of performance and price.

At more technical level, the invention allows efficiently sharing a multi-core based computing hardware among a number of application software programs, each executing on a time variable number of cores, maximizing the whole system data processing throughput, while providing deterministic minimum system processing capacity access levels for each one of the applications configured to run on the given system.

Moreover, the fabric network 400 (described in relation to FIGS. 4-7) enables running any application task on the system at any of its cores at any given time, in a restriction free manner, with minimized overhead, including minimized core idle times, and without a need for a collective operating system software during the system runtime operation (i.e., after its startup or maintenance configuration periods) to handle matters such monitoring, prioritizing, scheduling, placing and policing user applications and their tasks. According to the described embodiments of the invention, the fabric network achieves this optimally flexible use of the cores of the system in both software and hardware implementation efficient manner (including logic and wiring resource efficiently), without a need for either application to application, task to task, or core to core level cross-connectivity, as well as memory efficiently without a need for the cores to hold more than one task's image within their memories at a time. Instead of needing application task to task or core to core cross-connects for inter-task communications and/or memory image transfers, the invention achieves their purposes by more efficiently (in terms of system resources needed) through a set of multiplexers connecting the cores to application task specific segments at the fabric memory. The invention thereby enables application tasks running on any core of the fabric to communicate with any other task of the given application without requiring any such communicating task to know whether and where (at which core) the other tasks are running at any given time. The invention thus provides architecturally improved scalability for parallel data processing systems as the number of cores, applications and tasks within applications grows. To summarize, the invention enables each application program to dynamically get a maximized number of cores that it can utilize in parallel so long as such demand-driven core allocation allows all applications on the system to get at least up to their entitled number of cores whenever their processing load actually so demands.

The invented data processing systems and methods thus enable dynamically optimizing the allocation of its parallel processing capacity among a number of concurrently running application software programs, in a manner that is adaptive to realtime processing loads offered by the applications, with minimized system (hardware and software) overhead costs. Furthermore, the system per FIG. 1-7 and related descriptions, in particular when combined with pricing optimization and billing techniques per FIG. 8 and related descriptions, enables maximizing the overall utility computing cost-efficiency. Accordingly, benefits of the invented, application load adaptive, minimized overhead multi-user data processing system include:

Practically all the application processing time of all the cores across the system is made available to the user applications, as there is no need for a common system software to run on the system (e.g. to perform in the cores traditional operating system tasks such as time tick processing, serving interrupts, scheduling and placing applications and their tasks to the cores.

The application programs do not experience any considerable delays in ever waiting access to their (e.g. contract-based) entitled share of the system processing capacity, as any number of the processing applications configured for the system can run on the system concurrently, with a dynamically optimized number of parallel cores allocated per an application.

The allocation of the processing time across all the cores of the system among the application programs sharing the system is adaptive to realtime processing loads of these applications.

There is inherent security (including, where desired, isolation) between the individual processing applications in the system, as each application resides in its dedicated (logical) segment of the system memory, and can safely use the shared processing system effectively as if it was the sole application running on it. This hardware based security among the application programs and tasks sharing a multi-core data processing system per the invention further facilitates more straightforward, cost-efficient and faster development and testing of applications and tasks to run on such systems, as undesired interactions between the different user application programs can be disabled already at the system hardware resource access level.

The invention thus enables maximizing the data processing throughput per unit cost across all the processing applications configured to run on the shared multi-core computing system.

The hardware based scheduling and context switching of the invented system accordingly ensures that any given application gets at least its entitled share of the shared parallel processing system capacity whenever the given processing application actually is able to utilize at least its entitled quota of system capacity, and as much processing capacity beyond its entitled quota as is possible without blocking the access to the entitled and fair share of the processing capacity by any other application program that is actually able at that time to utilize such capacity that it is entitled to. For instance, the invention thus enables any given user application to get access to the full processing capacity of the multi-core system whenever the given application is the sole application offering processing load for the shared multi-core system. In effect, the invention provides for each user application assured access to its contract based percentage (e.g. 10%) of the multi-core system throughput capacity, plus most of the time much greater share, even 100%, of the processing system throughput capacity, with the cost base for any given user application being largely defined by only its committed access percentage worth of the shared multi-core processing system costs.

The references [1], [2], [3], [4], [5] and [6] provide further reference specifications and use cases for aspects and embodiments of the invented techniques.

CONCLUSIONS

This description and drawings are included to illustrate architecture and operation of practical embodiments of the invention, but are not meant to limit the scope of the invention. For instance, even though the description does specify certain system parameters to certain types and values, persons of skill in the art will realize, in view of this description, that any design utilizing the architectural or operational principles of the disclosed systems and methods, with any set of practical types and values for the system parameters, is within the scope of the invention. For instance, in view of this description, persons of skill in the art will understand that the disclosed architecture sets no actual limit for the number of cores in a given system, or for the maximum number of applications or tasks to execute concurrently. Moreover, the system elements and process steps, though shown as distinct to clarify the illustration and the description, can in various embodiments be merged or combined with other elements, or further subdivided and rearranged, etc., without departing from the spirit and scope of the invention. It will also be obvious to implement the systems and methods disclosed herein using various combinations of software and hardware. Finally, persons of skill in the art will realize that various embodiments of the invention can use different nomenclature and terminology to describe the system elements, process phases etc. technical concepts in their respective implementations. Generally, from this description many variants will be understood by one skilled in the art that are yet encompassed by the spirit and scope of the invention.

What is claimed is:

1. A control system for a multi-core data processing fabric, the system comprising:
    a subsystem for periodically, once for each of a series of successive core allocation periods (CAPs), allocating cores of the multi-core data processing fabric among instances of a set of programs configured to dynamically share the multi-core data processing fabric;
    a subsystem for ranking the instances of each program of the set of programs in a respective intra-program execution priority order, with, for any given program of the set of programs, an instance ready for execution at a given time ranked ahead in the respective intra-program execution priority order than another instance not ready for execution at the given time;
    a subsystem for selecting, for any given program of the set of programs, the given program having been allocated K (a positive integer) of the cores for a given CAP of the CAPs, K highest priority instances of the given program for processing on the multi-core data processing fabric on the given CAP at least in part based on said ranking, wherein, at least for some of the CAPs and some of the set of programs, the positive integer K is a plurality up to a count of the cores in the multi-core data processing fabric;
    a subsystem for, at least in part based on said selecting, assigning instances of said set of programs for processing by the cores of the multi-core data processing fabric; and
    a subsystem for, at least in part based on said assigning, providing a configuration for a cross-connect to connect the cores of the multi-core data processing fabric and program instance specific segments at a fabric memory;
    wherein at least one of the subsystems for allocating, selecting, assigning and providing the configuration comprises hardware logic that operates without software involvement on at least some of the CAPs.

2. The system of claim 1, wherein at least one of the subsystems for allocating, selecting, assigning and providing the configuration is implemented in digital hardware that operates without software involvement on at least some of the CAPs.

3. The system of claim 1 implemented by digital hardware that operates without software involvement on at least some of the CAPs.

4. The system of claim 1, wherein the configuration for the cross-connect comprises an identification of at least one of: (i) a core within the multi-core data processing fabric that is assigned to process a given instance of a given program of said set of programs, and (ii) an instance of a program of said set of programs that is mapped to a given core of the cores within the multi-core data processing fabric for processing.

5. The system of claim 1, wherein the subsystem for providing the configuration configures: (i) at least one given multiplexer among an array of program instance specific multiplexers at the cross-connect to connect one of the cores of the multi-core data processing fabric to such a program instance specific memory segment at the fabric memory that the given program instance specific multiplexer is specific to, and (ii) at least one given multiplexer among an array of core specific multiplexers at the cross-connect to connect one of the program instance specific segments at the fabric memory to such a core of the cores of the multi-core data processing fabric that the given core specific multiplexer is specific to.

6. The system of claim 1, wherein the subsystem for allocating comprises hardware logic for allocating the cores at least in part based on core demand expressions of at least some of the set of programs.

7. A control system for a multi-core data processing fabric, the system comprising:
    a subsystem for periodically, once for each of a series of successive core allocation periods (CAPs), allocating cores of the multi-core data processing fabric among instances of a set of programs configured to dynamically share the multi-core data processing fabric, at least in part based on core demand expressions of at least some programs of the set of programs; and
    a subsystem for ranking the instances of each individual program of the set of programs in a respective intra-program execution priority order, with, for any given of the set of programs, an instance of the respective program ready for execution at a given time ranked ahead in the execution priority order than another instance of the respective program not ready for execution at the given time;
    a subsystem for, any given program of the set of programs, the given program having been allocated K (a positive integer) of the cores for a given CAP of the CAPs, selecting K highest priority instances of the given program for processing on the multi-core data processing fabric on the given CAP at least in part based on said ranking, wherein, at least for some of the CAPs and some of the set of programs, the positive integer K is a plurality up to a count of the cores in the multi-core data processing fabric; and
    a subsystem for, at least in part based on said selecting, assigning instances of said set of programs for processing by cores of the multi-core data processing fabric;
    wherein at least one of the subsystems for allocating, selecting and assigning comprises hardware logic that operates without software involvement on at least some of the CAPs.

8. The system of claim 7 implemented by digital hardware that operates without software involvement on at least some of the CAPs.

9. The system of claim 7, wherein the subsystem for allocating comprises hardware logic for allocating the cores, for an upcoming CAP of the CAPs, at least in part based on (I) core demand figures (CDFs) of the set of programs for the upcoming CAP and (II) core entitlements (CEs) of the set of programs for the upcoming CAP,
    wherein the CE of a given program of the set of programs for a given CAP of the CAPs is an amount of cores up to which the given program is assured to have the CDFs of the given program matched by cores allocated to the given program on the given CAP, however without the given program getting cores worth of the CE of the given program allocated to the given program automatically irrespective of the CDF of the given program for the given CAP, and with it being possible for the given program to get allocated K cores beyond either or both of the CDF of the given program and the CE fo the given program worth of the cores in cases where a sum of the CDFs of the set of programs on the given CAP is less than a total amount of cores in the multi-core data processing fabric.

10. The system of claim 9, wherein the given program is assessed costs, for the given CAP, based at least in part on (a) the CE of the given program for the given CAP, and (b) a portion of the CDF of the given program matched by an amount of K cores allocated to the given program on the given CAP, with such portion referred to as demand based core allocation (DBCA).

11. The system of claim 10, wherein the given program is assessed costs, for the given CAP, further based at least in part on (i) a unit cost for the CEs, and (ii) a unit cost for the DBCAs, wherein each of said unit costs is a cost measure per core of the cores per CAP of the CAPs that stays equal across a range of amounts of cores allocatable to the given program, including, in case of the unit cost for the DBCAs, for cores allocated below and above the CE of the given program on the given CAP.

12. A control process for a multi-core fabric, the process comprising a set of sub-processes including:
    periodically, once for each of a series of successive core allocation periods (CAPs), allocating cores of the multi-core fabric among instances of a set of programs configured to dynamically share the multi-core fabric;
    selecting, for any given program of the set of programs, the given program having been allocated K (a positive integer) of the cores for a given one of the CAPs, K highest priority instances of the given program for processing on the multi-core fabric on the given CAP, so that an instance of the given program ready for execution at a given time gets a higher execution priority order than another instance not ready for execution at the given time, and wherein, at least for some of the CAPs and some of the set of programs, the positive integer K is a plurality up to a count of the cores in the multi-core fabric; and
    at least in part based on said selecting, assigning instances of said set of programs for processing by cores of the multi-core fabric,
    wherein the sub-process for allocating allocates the cores, for an upcoming CAP, of the CAPs, at least in part based on (I) core demand figures (CDFs) of the set of programs for the upcoming CAP and (II) core entitlements (CEs) of the set of programs for the upcoming CAP,
    wherein the CE of a given program of the set of programs for a given CAP is an amount of the cores up to which the given program is assured to have the CDFs of the given program matched by the K cores allocated to the given program on the given CAP, however without the given program getting cores worth of the CE of the given program allocated to the given program automatically irrespective of the CDF of the given program for the given CAP, and with it being possible for the given program to get allocated cores beyond either or both of the CDF of the given program and the CE of the given program worth of the cores in a case where a sum of the CDFs of the set of programs on the given CAP is less than a total amount of cores in the multi-core fabric, and
    wherein at least one of the set of sub-processes is implemented with digital hardware that is capable of operating without software involvement on at least some of the CAPs.

13. The process of claim 12, implemented by digital hardware that operates without software involvement on at least some of the CAPs.

14. The process of claim 12, wherein the given program is assessed costs, for the given CAP, based at least in part on (a) the CE level of the given program for the given CAP, and (b) a portion of the CDF of the given program matched by an amount of the K allocated cores of the given program on the given CAP, with such portion referred to as demand based core allocation (DBCA).

15. The process of claim 14, wherein the given program is assessed costs, for the given CAP, further based at least in part on (i) a unit cost for the CEs, and (ii) a unit cost for the DBCAs, wherein each of said unit costs is a cost measure per core of the cores per CAP of the CAPs that stays equal across a range of amounts of cores allocatable to the given program, including, in case of the unit cost for the DBCAs, for cores allocated below and above the CE of the given program on the given CAP.

* * * * *